(12) United States Patent
Chen et al.

(10) Patent No.: US 12,137,387 B2
(45) Date of Patent: Nov. 5, 2024

(54) TRIGGER-BASED WLAN SENSING WITH MULTIPLE SENSING RESPONDERS

(71) Applicant: Intel Corporation, Santa Clara, CA (US)

(72) Inventors: Cheng Chen, Camas, WA (US); Carlos Cordeiro, Portland, OR (US); Claudio Da Silva, Portland, OR (US); Bahareh Sadeghi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/234,714

(22) Filed: Aug. 16, 2023

(65) Prior Publication Data

US 2023/0396957 A1 Dec. 7, 2023

Related U.S. Application Data

(63) Continuation of application No. 17/351,810, filed on Jun. 18, 2021, now Pat. No. 11,849,369.

(60) Provisional application No. 63/040,830, filed on Jun. 18, 2020.

(51) Int. Cl.
*H04W 4/02* (2018.01)

(52) U.S. Cl.
CPC .................................. *H04W 4/027* (2013.01)

(58) Field of Classification Search
CPC .................................................. H04W 4/027
See application file for complete search history.

(56) References Cited

U.S. PATENT DOCUMENTS

| | | |
|---|---|---|
| 2021/0314732 A1 | 10/2021 | Chen et al. |
| 2022/0304051 A1 | 9/2022 | Aboul-magd et al. |
| 2023/0221428 A1* | 7/2023 | Jang ..................... H04W 76/11 342/42 |

OTHER PUBLICATIONS

"U.S. Appl. No. 17/351,810, 312 Amendment filed Aug. 15, 2023", 17 pgs.
"U.S. Appl. No. 17/351,810, Notice of Allowance mailed Aug. 1, 2023", 9 pgs.
"U.S. Appl. No. 17/351,810, PTO Response to Rule 312 Communication mailed Aug. 24, 2023", 2 pgs.
U.S. Appl. No. 17/351,810, filed Jun. 18, 2021, Multi-Device Wireless Sensing.

* cited by examiner

*Primary Examiner* — Curtis B Odom
(74) *Attorney, Agent, or Firm* — Schwegman Lundberg & Woessner, P.A

(57) ABSTRACT

Methods, apparatuses, and computer readable media for report identification and power control for multi-device wireless sensing in a wireless network are disclosed. An apparatus of an access point (AP) is disclosed, where the apparatus comprises processing circuitry configured to encode for transmission to a station (STA) a frame comprising a configuration hold subfield, the hold subfield indicating whether the STA should maintain a transmit configuration unchanged during uplink (UL) sensing. The processing circuitry further configured to encode for transmission a trigger frame (TF) for sensing, the TF for sensing including an identification of the STA, an indication of a resource unit (RU) for the STA to use to transmit an uplink (UL) sensing packet, and TF type subfield, the a TF type subfield indicating the TF for sensing.

20 Claims, 18 Drawing Sheets

2000

2002 — DECODE A TRIGGER FRAME (TF) FOR SENSING, THE TF FOR SENSING COMPRISING AN IDENTIFICATION OF THE STA, AN INDICATION OF A RESOURCE UNIT (RU) FOR THE STA TO USE TO TRANSMIT AN UPLINK (UL) SENSING PACKET, AND TF TYPE SUBFIELD, THE TF TYPE SUBFIELD INDICATING A TYPE OF TF FOR SENSING

2004 — ENCODE FOR TRANSMISSION THE UL SENSING PACKET IN ACCORDANCE WITH THE RU

FIG. 20

TRIGGER-BASED WLAN SENSING WITH MULTIPLE SENSING RESPONDERS

PRIORITY CLAIM

This application is a continuation of U.S. patent application Ser. No. 17/351,810, filed Jun. 18, 2021, which claims the benefit of priority under 35 U.S.C. 119(e) to U.S. Provisional Patent Application Ser. No. 63/040,830 filed Jun. 18, 2020, each of which is incorporated herein by reference in its entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to IEEE 802.11az, IEEE 802.11ax, and/or IEEE 802.11be. Some embodiments relate to a mechanism for multiple devices to perform sensing of objects or motion by transmitting and receiving wireless signals.

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which:

FIG. 20 illustrates a method of multi-device wireless sensing, in accordance with some embodiments.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments relate to methods, computer readable media, and apparatus for ordering or scheduling location measurement reports, traffic indication maps (TIMs), and other information during SPs. Some embodiments relate to methods, computer readable media, and apparatus for extending TIMs. Some embodiments relate to methods, computer readable media, and apparatus for defining SPs during beacon intervals (BI), which may be based on TWTs.

Figure 1:
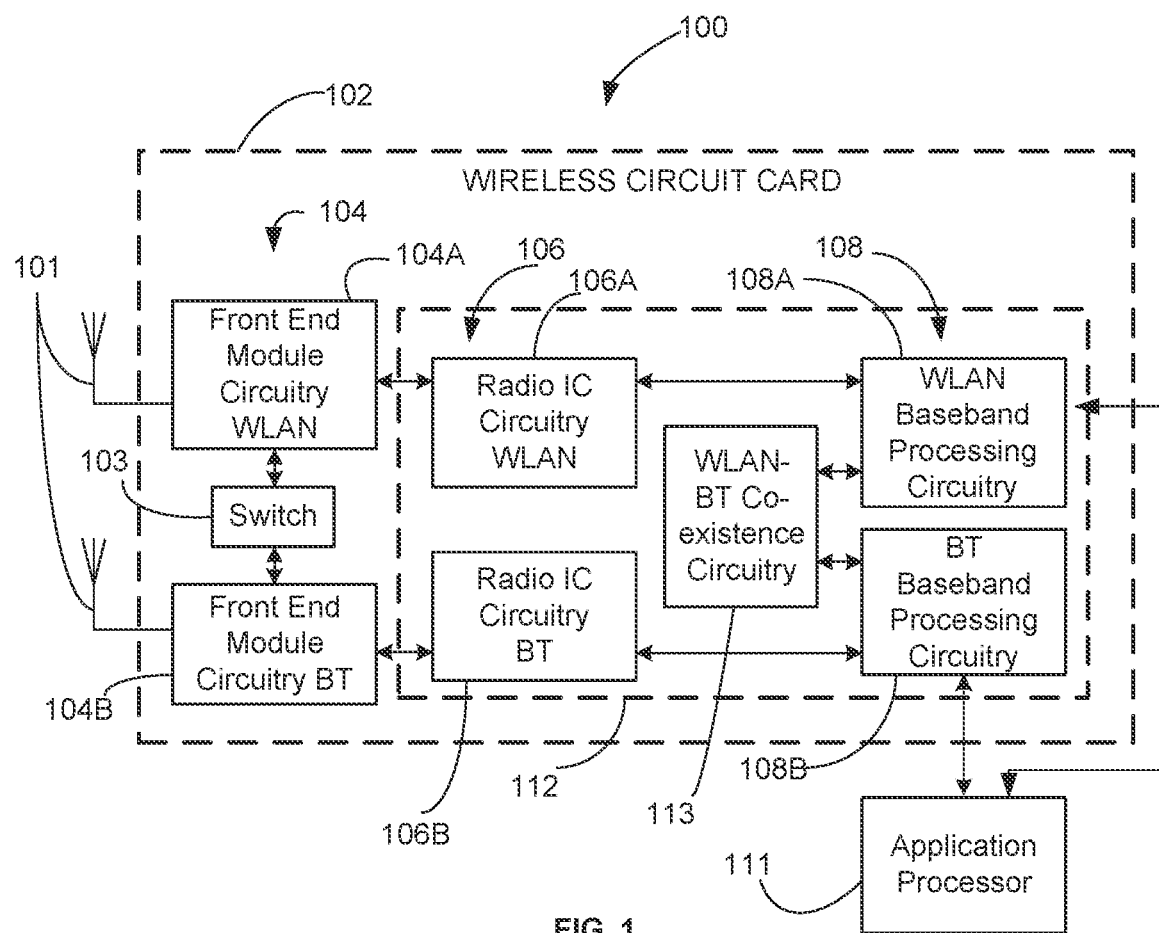
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. WLAN FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although WLAN FEM circuitry 104A and BT FEM circuitry 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the WLAN FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the BT FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband processing circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband processing circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM circuitries 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or IC, such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, and/or IEEE 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link.

In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
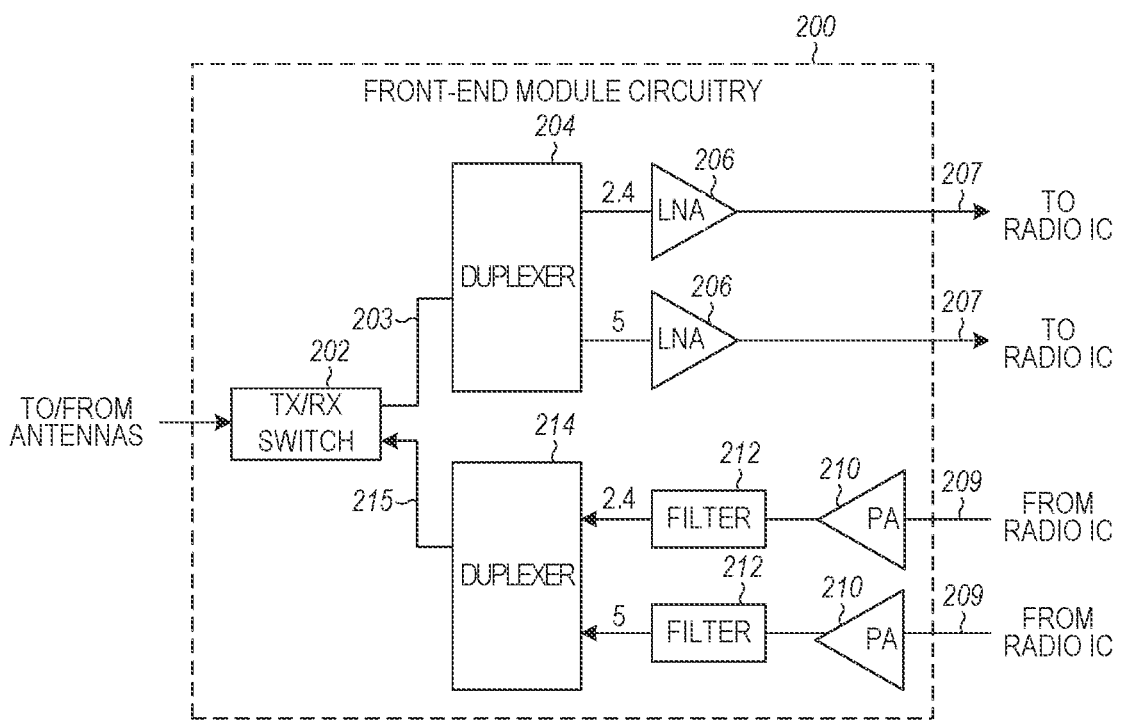
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
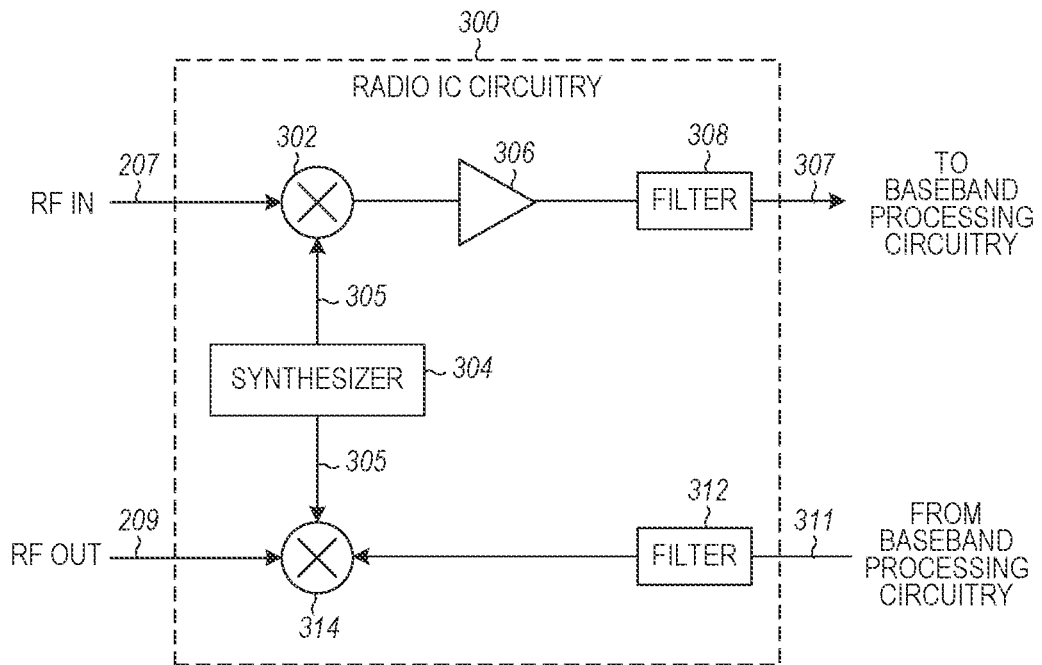
FIG. 3 illustrates a radio IC circuitry for use in the radio architecture of FIG. 1 in accordance with some embodiments.

FIG. 3 illustrates radio integrated circuit (IC) circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer circuitry 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively.

In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer circuitry 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
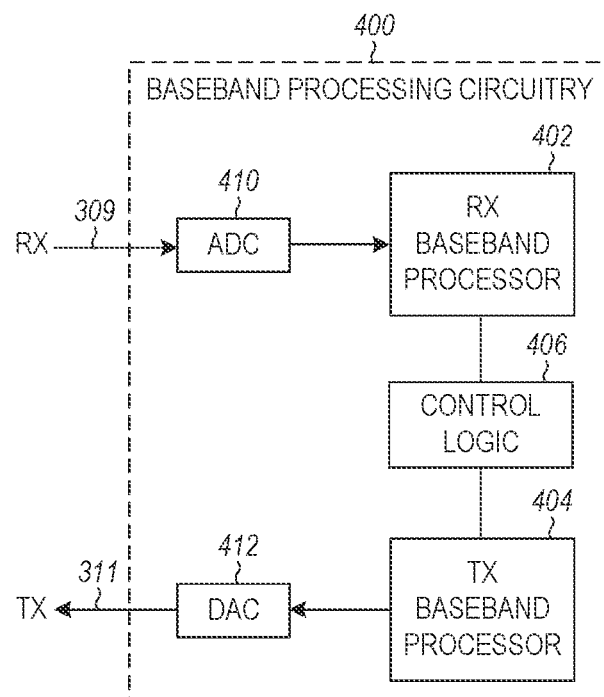
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through WLAN baseband processing circuitry 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
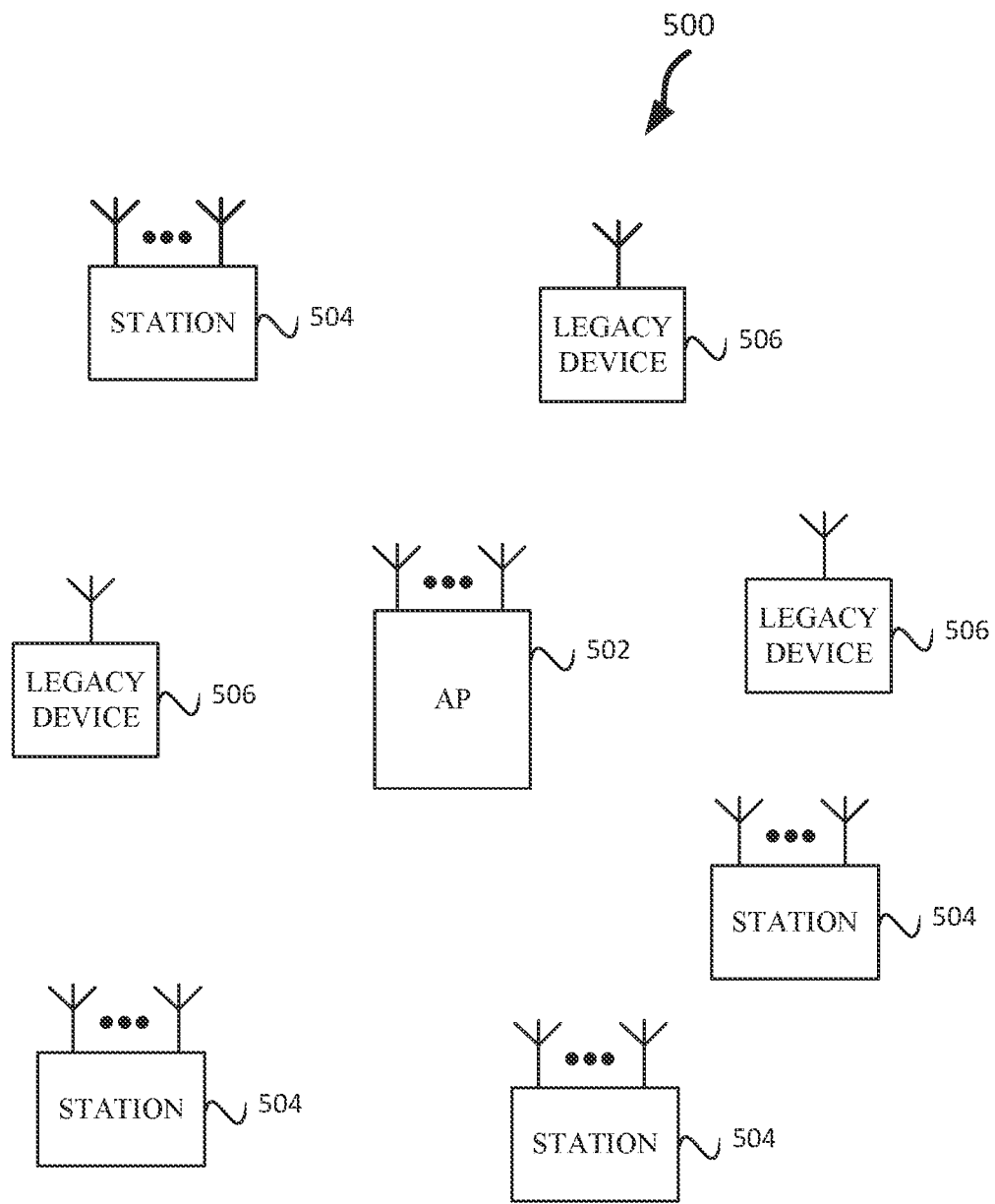
FIG. 5 illustrates a WLAN in accordance with some embodiments.

FIG. 5 illustrates a WLAN 500 in accordance with some embodiments. The WLAN 500 may comprise a basis service set (BSS) that may include an access point (AP) 502, a plurality of stations (STAs) 504, and a plurality of legacy devices 506. In some embodiments, the STAs 504 and/or AP 502 are configured to operate in accordance with IEEE 802.11be extremely high throughput (EHT) and/or high efficiency (HE) IEEE 802.11ax. In some embodiments, the STAs 504 and/or AP 520 are configured to operate in accordance with IEEE 802.11az. In some embodiments, IEEE 802.11EHT may be termed Next Generation 802.11.

The AP 502 may be an AP using the IEEE 802.11 to transmit and receive. The AP 502 may be a base station. The AP 502 may use other communications protocols as well as the IEEE 802.11 protocol. The EHT protocol may be termed a different name in accordance with some embodiments. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one EHT AP 502 that is part of an extended service set (ESS). A controller (not illustrated) may store information that is common to the more than one APs 502 and may control more than one BSS, e.g., assign primary channels, colors, etc. AP 502 may be connected to the internet.

The legacy devices 506 may operate in accordance with one or more of IEEE 802.11 a/b/g/n/ac/ad/af/ah/aj/ay/ax, or another legacy wireless communication standard. The legacy devices 506 may be STAs or IEEE STAs. The STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11be or another wireless protocol.

The AP 502 may communicate with legacy devices 506 in accordance with legacy IEEE 802.11 communication techniques. In example embodiments, the H AP 502 may also be configured to communicate with STAs 504 in accordance with legacy IEEE 802.11 communication techniques.

In some embodiments, a HE or EHT frames may be configurable to have the same bandwidth as a channel. The HE or EHT frame may be a physical Layer Convergence Procedure (PLCP) Protocol Data Unit (PPDU). In some embodiments, PPDU may be an abbreviation for physical layer protocol data unit (PPDU). In some embodiments, there may be different types of PPDUs that may have different fields and different physical layers and/or different media access control (MAC) layers. For example, a single user (SU) PPDU, multiple-user (MU) PPDU, extended-range (ER) SU PPDU, and/or trigger-based (TB) PPDU. In some embodiments EHT may be the same or similar as HE PPDUs.

The bandwidth of a channel may be 20 MHz, 40 MHz, or 80 MHz, 80+80 MHz, 160 MHz, 160+160 MHz, 320 MHz, 320+320 MHz, 640 MHz bandwidths. In some embodiments, the bandwidth of a channel less than 20 MHz may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A HE or EHT frame may be configured for transmitting a number of spatial streams, which may be in accordance with MU-MIMO and may be in accordance with OFDMA. In other embodiments, the AP 502, STA 504, and/or legacy device 506 may also implement different technologies such as code division multiple access (CDMA) 2000, CDMA 2000 1×, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, low-power BlueTooth®, or other technologies.

In accordance with some IEEE 802.11 embodiments, e.g, IEEE 802.11EHT/ax embodiments, a HE AP 502 may operate as a master station which may be arranged to contend for a wireless medium (e.g., during a contention period) to receive exclusive control of the medium for a transmission opportunity (TXOP). The AP 502 may transmit an EHT/HE trigger frame transmission, which may include a schedule for simultaneous UL/DL transmissions from STAs 504. The AP 502 may transmit a time duration of the TXOP and sub-channel information. During the TXOP, STAs 504 may communicate with the AP 502 in accordance with a non-contention based multiple access technique such as OFDMA or MU-MIMO. This is unlike conventional WLAN communications in which devices communicate in accordance with a contention-based communication technique, rather than a multiple access technique. During the HE or EHT control period, the AP 502 may communicate with stations 504 using one or more HE or EHT frames. During the TXOP, the HE STAs 504 may operate on a sub-channel smaller than the operating range of the AP 502. During the TXOP, legacy stations refrain from communicating. The legacy stations may need to receive the communication from the HE AP 502 to defer from communicating.

In accordance with some embodiments, during the TXOP the STAs 504 may contend for the wireless medium with the legacy devices 506 being excluded from contending for the wireless medium during the master-sync transmission. In some embodiments the trigger frame may indicate an UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the HE or EHT TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The AP 502 may also communicate with legacy devices 506 and/or STAs 504 in accordance with legacy IEEE 802.11 communication techniques. In some embodiments, the AP 502 may also be configurable to communicate with STAs 504 outside the TXOP in accordance with legacy IEEE 802.11 or IEEE 802.11EHT/ax communication techniques, although this is not a requirement.

In some embodiments the STA 504 may be a "group owner" (GO) for peer-to-peer modes of operation. A wireless device may be a STA 504 or a HE AP 502.

In some embodiments, the STA 504 and/or AP 502 may be configured to operate in accordance with IEEE 802.11mc. In example embodiments, the radio architecture of FIG. 1 is configured to implement the STA 504 and/or the AP 502. In example embodiments, the front-end module circuitry of FIG. 2 is configured to implement the STA 504 and/or the AP 502. In example embodiments, the radio IC circuitry of FIG. 3 is configured to implement the HE station 504 and/or the AP 502. In example embodiments, the base-band processing circuitry of FIG. 4 is configured to implement the STA 504 and/or the AP 502.

In example embodiments, the STAs 504, AP 502, an apparatus of the STA 504, and/or an apparatus of the AP 502 may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein described in conjunction with FIGS. 1-20.

In example embodiments, the STAs 504 and/or the HE AP 502 are configured to perform the methods and operations/functions described herein in conjunction with FIGS. 1-20. In example embodiments, an apparatus of the STA 504 and/or an apparatus of the AP 502 are configured to perform the methods and functions described herein in conjunction with FIGS. 1-20. The term Wi-Fi may refer to one or more of the IEEE 802.11 communication standards. AP and STA may refer to EHT/HE access point and/or EHT/HE station as well as legacy devices 506.

In some embodiments, a HE AP STA refers to an AP 502 and/or STAs 504 that are operating as EHT APs 502. In some embodiments, when a STA 504 is not operating as an AP, it may be referred to as a non-AP STA or non-AP. In some embodiments, STA 504 may be referred to as either an AP STA or a non-AP.

In some embodiments, a physical layer protocol data unit (PPDU) may be a physical layer conformance procedure (PLCP) protocol data unit (PPDU). In some embodiments, the AP 502 and STAs 504 may communicate in accordance with one of the IEEE 802.11 standards such as 11az, 11bf, 11be, 11r, 11i, and/or 11w. IEEE P802.11be™/D1.0, May 2021, IEEE Std 802.11™-2020, Dec. 3, 2020, and IEEE P802.11az™/D3.0 January, 2021 are incorporated herein by reference in their entirety.

Figure 6:
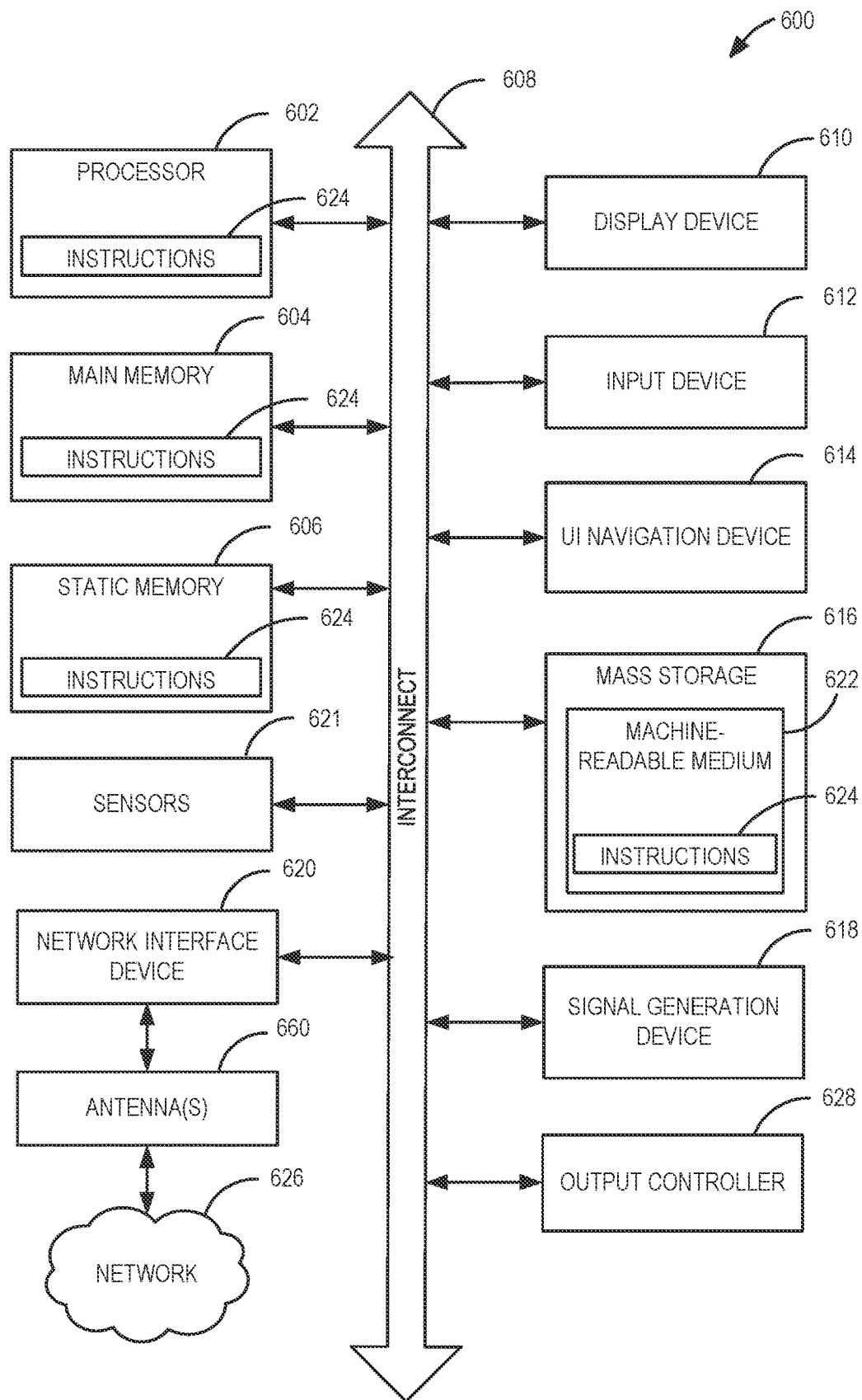
FIG. 6 illustrates a block diagram of an example machine upon which any one or more of the techniques (e.g., methodologies) discussed herein may perform.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a HE AP 502, EVT station 504, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage device 616 (e.g., drive unit), a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared(IR), near field communication (NFC), etc.) connection to communicate or control one or more peripheral devices (e.g., a printer, card reader, etc.). In some embodiments the processor 602 and/or instructions 624 may comprise processing circuitry and/or transceiver circuitry.

The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared(IR), near field communication (NFC), etc.) connection to communicate or control one or more peripheral devices (e.g., a printer, card reader, etc.). In some embodiments the processor 602 and/or instructions 624 may comprise processing circuitry and/or transceiver circuitry.

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 622 is illustrated as a single medium, the term "machine readable medium" may include a single medium or multiple media (e.g., a centralized or distributed database, and/or associated caches and servers) configured to store the one or more instructions 624.

An apparatus of the machine 600 may be one or more of a hardware processor 602 (e.g., a central processing unit (CPU), a graphics processing unit (GPU), a hardware processor core, or any combination thereof), a main memory 604 and a static memory 606, sensors 621, network interface device 620, antennas 660, a display device 610, an input device 612, a UI navigation device 614, a mass storage 616, instructions 624, a signal generation device 618, and an output controller 628. The apparatus may be configured to perform one or more of the methods and/or operations disclosed herein. The apparatus may be intended as a component of the machine 600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine-readable media. In some examples, machine readable media may include machine readable media that is not a transitory propagating signal.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 7:
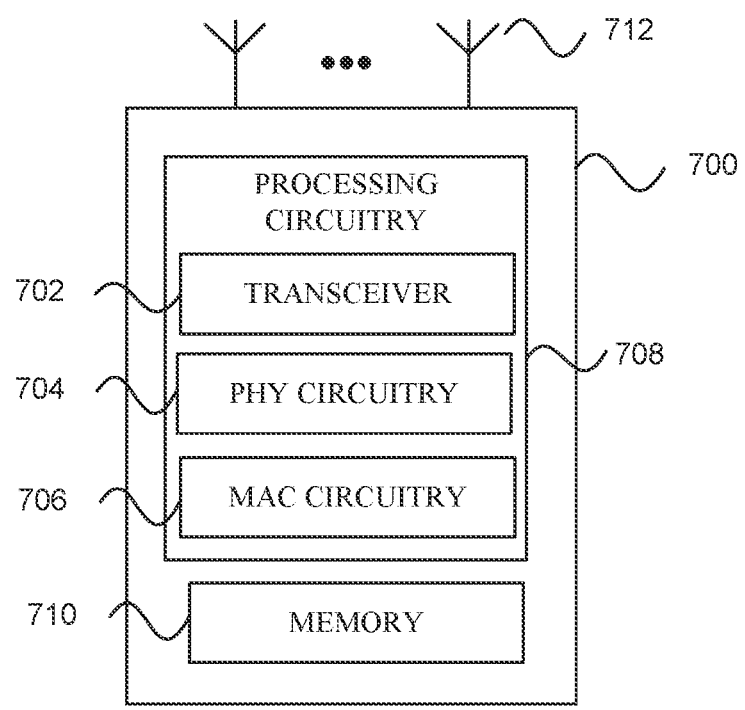
FIG. 7 illustrates a block diagram of an example wireless device upon which any one or more of the techniques (e.g., methodologies or operations) discussed herein may perform.

FIG. 7 illustrates a block diagram of an example wireless device 700 upon which any one or more of the techniques (e.g., methodologies or operations) discussed herein may perform. The wireless device 700 may be a HE device or HE wireless device. The wireless device 700 may be a HE STA 504, HE AP 502, and/or a HE STA or HE AP. A HE STA 504, HE AP 502, and/or a HE AP or HE STA may include some or all of the components shown in FIGS. 1-7. The wireless device 700 may be an example machine 600 as disclosed in conjunction with FIG. 6.

The wireless device 700 may include processing circuitry 708. The processing circuitry 708 may include a transceiver 702, physical layer circuitry (PHY circuitry) 704, and MAC layer circuitry (MAC circuitry) 706, one or more of which may enable transmission and reception of signals to and from other wireless devices 700 (e.g., HE AP 502, HE STA 504, and/or legacy devices 506) using one or more antennas 712. As an example, the PHY circuitry 704 may perform various encoding and decoding functions that may include formation of baseband signals for transmission and decoding of received signals. As another example, the transceiver 702 may perform various transmission and reception functions such as conversion of signals between a baseband range and a Radio Frequency (RF) range.

Accordingly, the PHY circuitry 704 and the transceiver 702 may be separate components or may be part of a combined component, e.g., processing circuitry 708. In addition, some of the described functionality related to transmission and reception of signals may be performed by a combination that may include one, any or all of the PHY circuitry 704 the transceiver 702, MAC circuitry 706, memory 710, and other components or layers. The MAC circuitry 706 may control access to the wireless medium. The wireless device 700 may also include memory 710 arranged to perform the operations described herein, e.g., some of the operations described herein may be performed by instructions stored in the memory 710.

The antennas 712 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 712 may be effectively separated to take advantage of spatial diversity and the different channel characteristics that may result.

One or more of the memory 710, the transceiver 702, the PHY circuitry 704, the MAC circuitry 706, the antennas 712, and/or the processing circuitry 708 may be coupled with one another. Moreover, although memory 710, the transceiver 702, the PHY circuitry 704, the MAC circuitry 706, the antennas 712 are illustrated as separate components, one or more of memory 710, the transceiver 702, the PHY circuitry 704, the MAC circuitry 706, the antennas 712 may be integrated in an electronic package or chip.

In some embodiments, the wireless device 700 may be a mobile device as described in conjunction with FIG. 6. In some embodiments the wireless device 700 may be configured to operate in accordance with one or more wireless communication standards as described herein (e.g., as described in conjunction with FIGS. 1-6, IEEE 802.11). In some embodiments, the wireless device 700 may include one or more of the components as described in conjunction with FIG. 6 (e.g., display device 610, input device 612, etc.) Although the wireless device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 700 may include various components of the wireless device 700 as shown in FIG. 7 and/or components from FIGS. 1-6. Accordingly, techniques and operations described herein that refer to the wireless device 700 may be applicable to an apparatus for a wireless device 700 (e.g., HE AP 502 and/or HE STA 504), in some embodiments. In some embodiments, the wireless device 700 is configured to decode and/or encode signals, packets, and/or frames as described herein, e.g., PPDUs.

In some embodiments, the MAC circuitry 706 may be arranged to contend for a wireless medium during a contention period to receive control of the medium for a HE TXOP and encode or decode an HE PPDU. In some embodiments, the MAC circuitry 706 may be arranged to contend for the wireless medium based on channel contention settings, a transmitting power level, and a clear channel assessment level (e.g., an energy detect level).

The PHY circuitry 704 may be arranged to transmit signals in accordance with one or more communication standards described herein. For example, the PHY circuitry 704 may be configured to transmit a HE PPDU. The PHY circuitry 704 may include circuitry for modulation/demodulation, upconversion/downconversion, filtering, amplification, etc. In some embodiments, the processing circuitry 708 may include one or more processors. The processing circuitry 708 may be configured to perform functions based on instructions being stored in a RAM or ROM, or based on special purpose circuitry. The processing circuitry 708 may include a processor such as a general purpose processor or special purpose processor. The processing circuitry 708 may implement one or more functions associated with antennas 712, the transceiver 702, the PHY circuitry 704, the MAC circuitry 706, and/or the memory 710. In some embodiments, the processing circuitry 708 may be configured to perform one or more of the functions/operations and/or methods described herein.

In mmWave technology, communication between a station (e.g., the HE stations 504 of FIG. 5 or wireless device 700) and an access point (e.g., the HE AP 502 of FIG. 5 or wireless device 700) may use associated effective wireless channels that are highly directionally dependent. To accommodate the directionality, beamforming techniques may be utilized to radiate energy in a certain direction with certain beamwidth to communicate between two devices. The directed propagation concentrates transmitted energy toward a target device in order to compensate for significant energy loss in the channel between the two communicating devices. Using directed transmission may extend the range of the millimeter-wave communication versus utilizing the same transmitted energy in omni-directional propagation.

Wi-Fi sensing is a term given to the use of Wi-Fi technology to perform radar-like applications such as detecting motion in a room or detecting when a person approaches a target device. Sensing is performed by tracking channel estimates obtained when decoding multiple Wi-Fi packets over time and detecting variations that indicate an event of interest.

Some embodiments enabling wireless sensing to determine objects or motion of objects such as detecting the approach of a person to a wireless device. Some embodiments include unidirectional null data packet (NDP) sounding, optional measurement reporting, AP or STA-initiated polling, and/or OFDMA resource units (RUs) in NDP sounding. A technical problem is how to detect motion or objects using existing wireless devices. The methods, computer-readable media, and apparatuses disclosed herein solve the technical problem by enabling existing wireless devices to transmit and receive wireless signals that are used to detect objects or motion.

Figure 8:
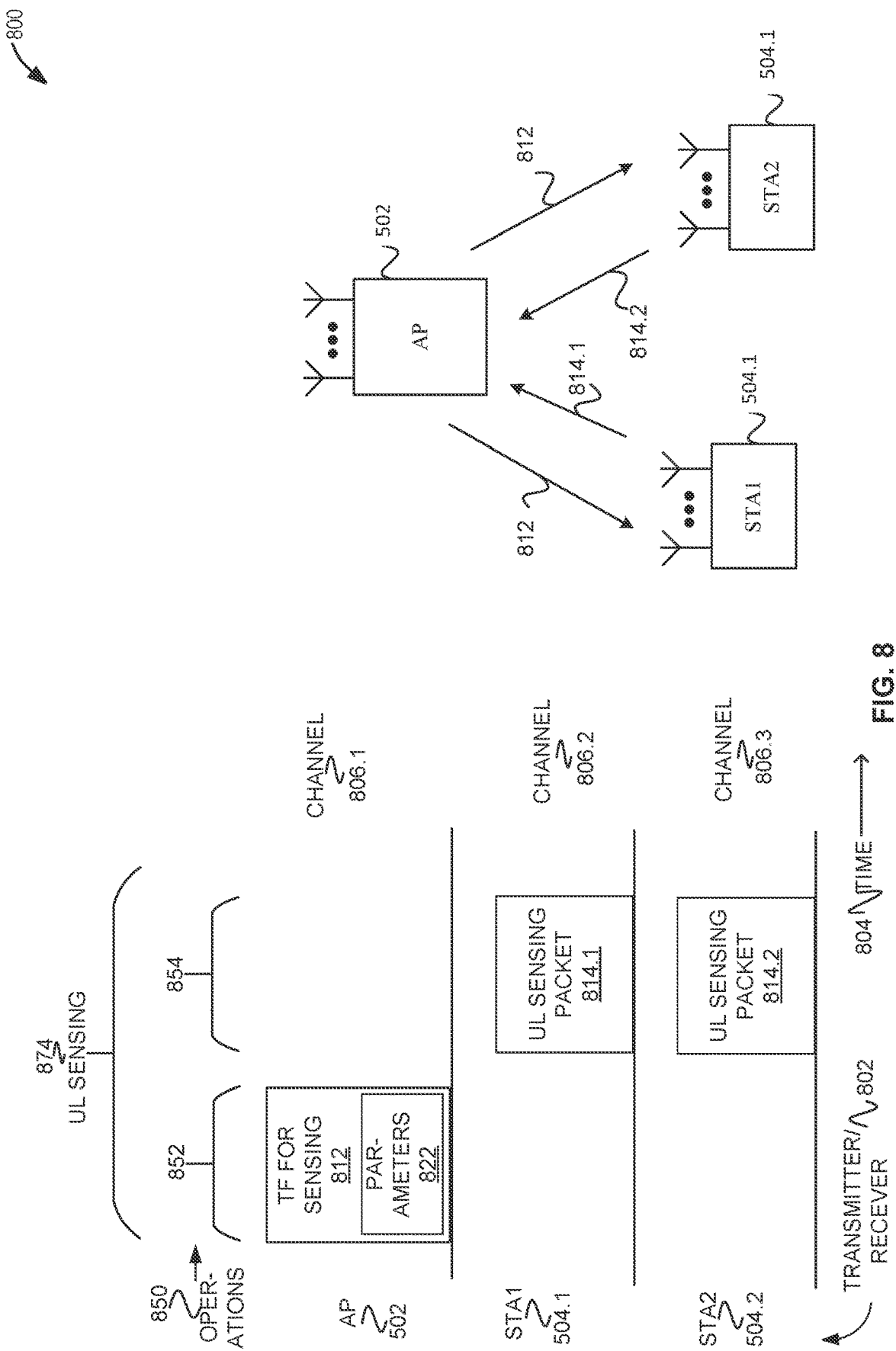
FIG. 8 illustrates a method of multi-device wireless sensing, in accordance with some embodiments.

FIG. 8 illustrates a method 800 of multi-device wireless sensing, in accordance with some embodiments. Illustrated in FIG. 8 is the AP 502 as a sensing initiator and the AP 502 as sensing receiver. The sensing initiator is initiating the multi-device wireless sensing method 800 and the sensing receiver receives either a report on the reception of the sensing packets or receives the sensing packets and processes the information in the sensing packets to determine whether there has been motion by an object. The channels 806.1, 806.2, 806.3 are channels (a frequency range and, optionally, one or more spatial streams) that are used to transmit and receive the frames, e.g., TF for sensing 812 and UL sensing packets 814. The channels 806 may be overlapping or may be distinct. For example, the TF ranging sensing 812 may be transmitted on a 20 MHz channel (channel 806.1, which may be a primary channel for a BSS), and in response UL sensing packet 814.1 and UL sensing packet 814.2 may be transmitted on different spatial streams of the same 20 MHz channel, on portions of the 20 MHz channel, or on different frequency ranges. OFDMA and/or MU-MIMO may be used for the UL sensing packets 814. The TF for sensing 812 includes information for the resource units (RUs) for the STAs 504 to use to transmit the UL sensing packets 814, which may occur a short interframe space (SIFS) after the end of the TF for sending 812.

The transmitter/receiver 802 is the AP 502 and STAs 504. Time 804 progresses from left to right. The method 800 includes operations 850. The operations 850 illustrated are part of UL sensing or a measurement reporting phase 874. The method 800 starts with operation 852 with the AP 502 (or sensor initiator) transmitting a TF for sensing 812, e.g., trigger frame 1700. The parameters 822 are parameters such as RUs, identifications of STAs, transmitter parameters, and so forth for the STAs 504 to use in operation 854. The method 800 continues at operation 854 with STA1 504.1 and STA 504.2 transmitting UL sensing packet 814.1 and UL sensing packet 814.2, respectively. The UL sensing packets 814 are null data packets (NDP) in accordance with some embodiments. The method 800 continues (not illustrated) with the AP 502 processing the UL sensing packets 814 to determine if there has been movement. The AP 502 and STAs 504 may be termed initiator stations (ISTAs) or responding station (RSTAs) depending on their role in method 800. STAs 504 may take the role of the AP 502 in accordance with some embodiments.

Figure 9:
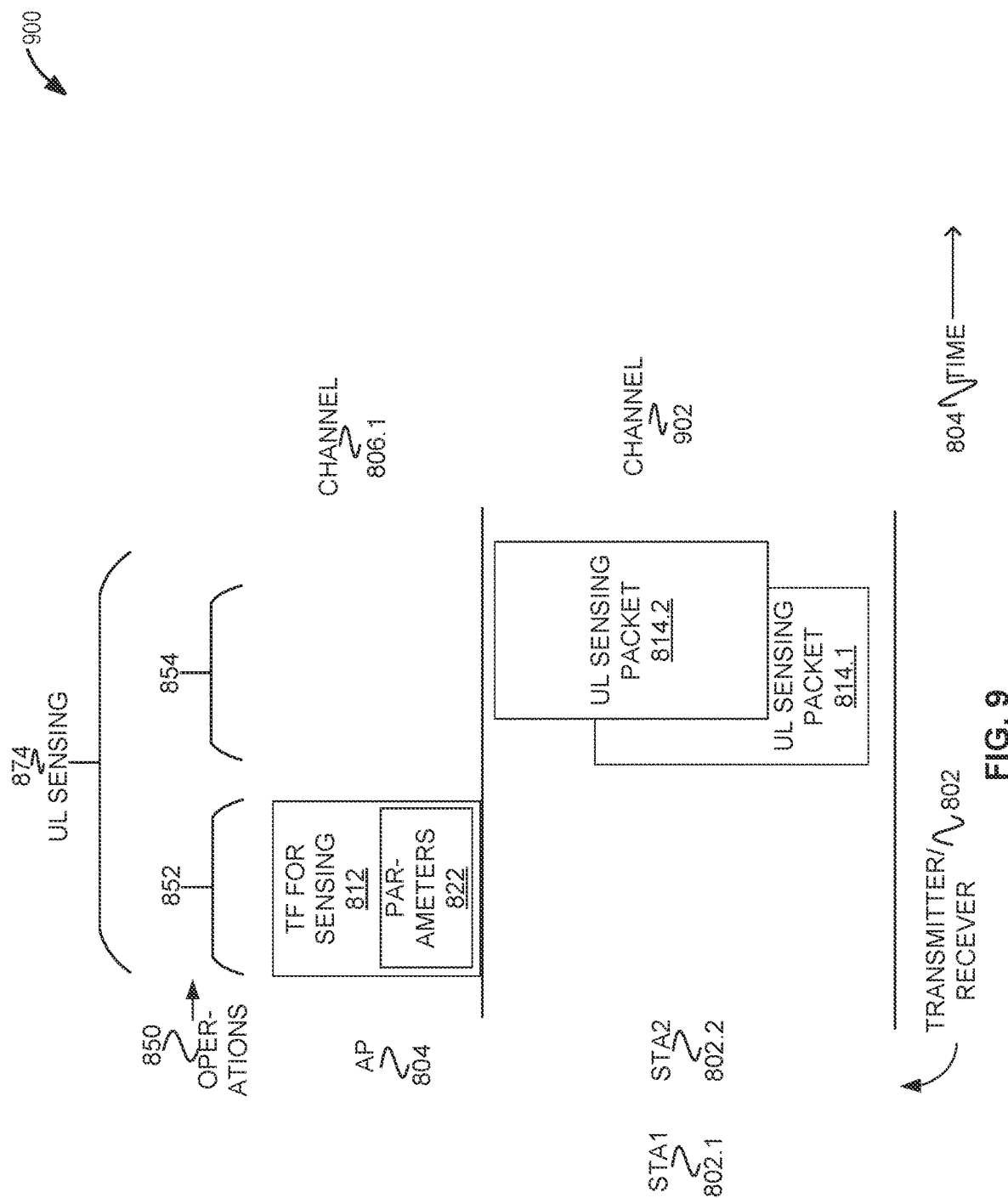
FIG. 9 illustrates a method of multi-device wireless sensing, in accordance with some embodiments.

FIG. 9 illustrates a method of multi-device wireless sensing 900, in accordance with some embodiments. FIG. 9 illustrates the method 800 of FIG. 8 where STA1 802.1 and STA2 802.2 transmit UL sensing packet 814.1 and UL sensing packet 814.2 on a channel 902 on different spatial streams, e.g., a number of a spatial stream (nSS) may indicate a number of a spatial stream and the use of MU-MIMO where UL OFDMA may be used to with additional STAs. In some embodiments, the STAs 802.1 and 802.2 may transmit on more than one spatial stream and on more than one channel.

Figure 10:
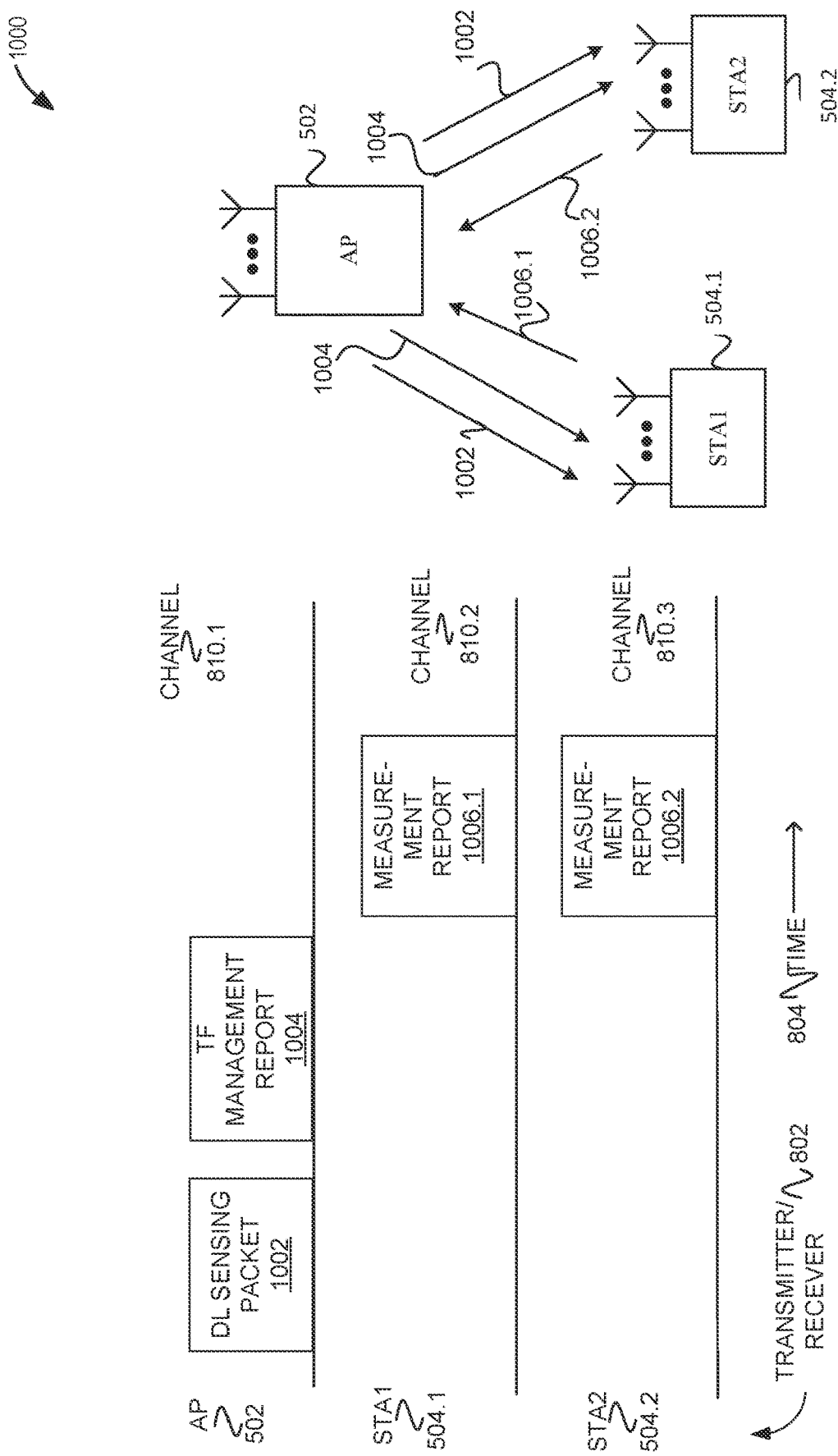
FIG. 10 illustrates a method of multi-device wireless sensing, in accordance with some embodiments.

FIG. 10 illustrates a method 1000 of multi-device wireless sensing, in accordance with some embodiments. Illustrated in FIG. 10 is the AP 502 as a sensing initiator and the AP 502 as sensing transmitter. The method 1000 includes the AP 502 transmitting DL sensing packet 1002. The DL sensing packet 1002 may be a NDP, in accordance with some embodiments. The DL sensing packet 1002 may be transmitted in accordance with OFDM and/or MIMO. The DL sensing packet 1002 may be multiple packets, e.g., sent on multiple spatial streams and/or on multiple frequency ranges such as 20 MHz channels.

The method 1000 includes transmitting a TF management report 1004. For example, trigger frame 1700 with a type of TF for management report or sensing management report. The TF management report 1004 includes RUs for the STAs 504 to transmit the measurement reports 1006. The RUs may be in accordance with OFDMA and/or MU-MIMO with specifications for a channel and/or one or more spatial streams. The method 1000 includes the STA1 504.1 and STA2 504.2 simultaneously transmitting measurement report 1006.1 and measurement report 1006.2, respectively, in accordance with RUs included in the TF management report 1004. In some embodiments, the RUs may be indicated in a previous frame such as a frame prior to the DL sensing packet 1002. A SIFS may be between each of the transmitted packets.

Figure 11:
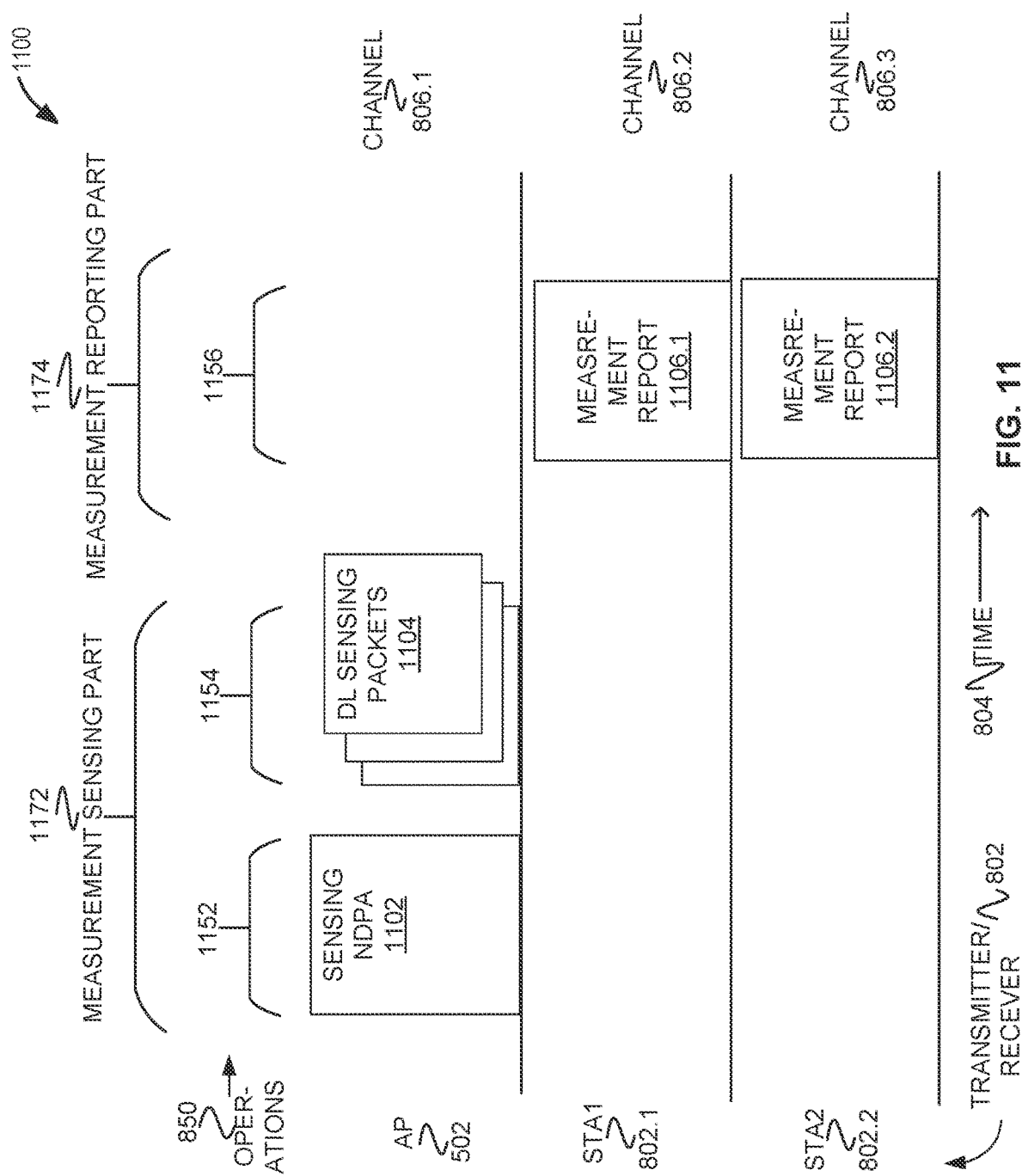
FIG. 11 illustrates a method of multi-device wireless sensing, in accordance with some embodiments.

FIG. 11 illustrates a method 1100 of multi-device wireless sensing, in accordance with some embodiments. Illustrated in FIG. 11 is the AP 502 as a sensing initiator and the AP 502 as sensing transmitter. The method 1100 includes operation 850 for a measurement sensing part 1172 and a measurement reporting part 1174. The method 1100 includes operation 1152 where the AP 502 transmits a sensing NDP announcement (NDPA) 1102 frame, e.g., sensing NDP announcement frame 1600. The sensing NDPA 1102 frame includes information for how the DL sensing packets 1104 are transmitted by the AP 502, e.g., duration information, channel information, number of DL sensing packets, spatial stream information, and so forth.

The method 1100 includes operation 1156 where STA1 802.1 and STA2 802.2 transmit measurement 1106.1 and 1106.2, respectively to the AP 502. The measurement reports 1106 may be on the same channel 806 using different spatial streams.

Figure 12:
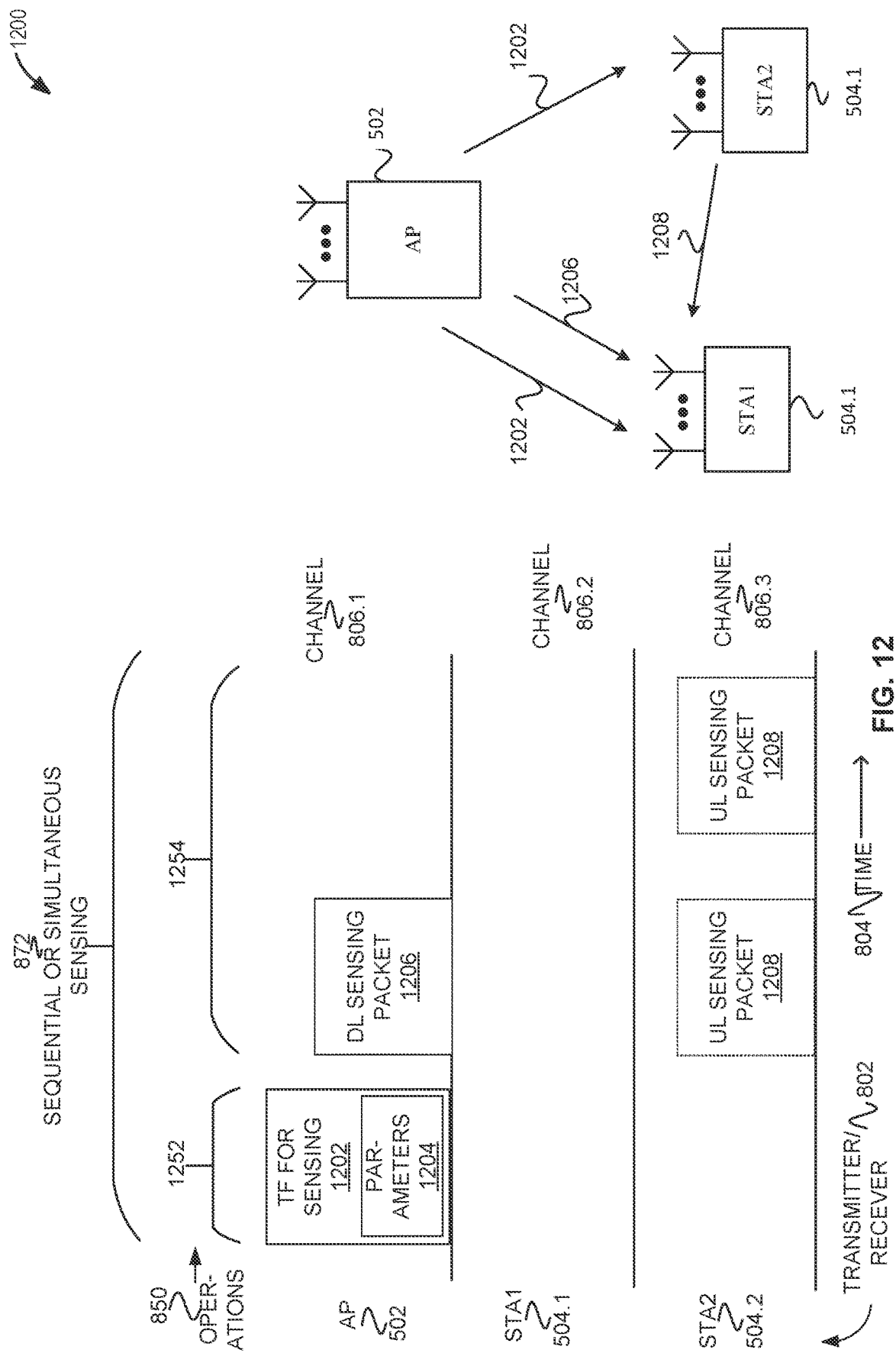
FIG. 12 illustrates a method of multi-device wireless sensing, in accordance with some embodiments.

FIG. 12 illustrates a method 1200 of multi-device wireless sensing, in accordance with some embodiments. Illustrated in FIG. 12 is STA1 504.1 as the sensing initiator and the sensing receiver. AP 502 as the sensing responder and the sending transmitter. STA2 504.2 as the sensing responder and the sensing transmitter.

The operations 850 include a sequential or simultaneous sensing 872. The method 1200 includes operation 1252 where the AP 502 transmits a TF for sensing 1202 with parameters 1204. For example, the TF for sensing 1202 is a TF 1700 with parameters that indicate the TF is for sensing. The TF for sensing 1202 includes parameters 1204 that indicate that STA2 504.2 and the AP 502 will transmit UL sensing packet 1208 and DL sensing packet 1206, respectively. The DL sensing packet 1206 and UL sensing packet 1208 may be transmitted in accordance with MU-MIMO and/or OFDMA. RUs indicated in the TF for sensing 1202 may include parameters 1204 as disclosed herein. The RUs may include indications of directional transmissions. The TF for sensing 1202 may include an indication of the parameters for the AP 502 to transmit DL sensing packet 1206 and for STA2 504.2 to transmit UL sensing packet 1208. STA1 504.1 receives the TF for sensing 1202 and uses the parameters to receive the DL sensing packet 1206 and the UL sensing packet 1208.

The method 1200 includes operation 1254 which may be either the AP 502 and STA2 504.2 transmitting simultaneously or sequentially and the AP 502 or the STA2 504.2 may transmit first for sequential transmissions. STA1 504.1 receives the DL sensing packet 1206 and the UL sensing packet 1208 and determines if movement of an object is detected.

Figure 13:
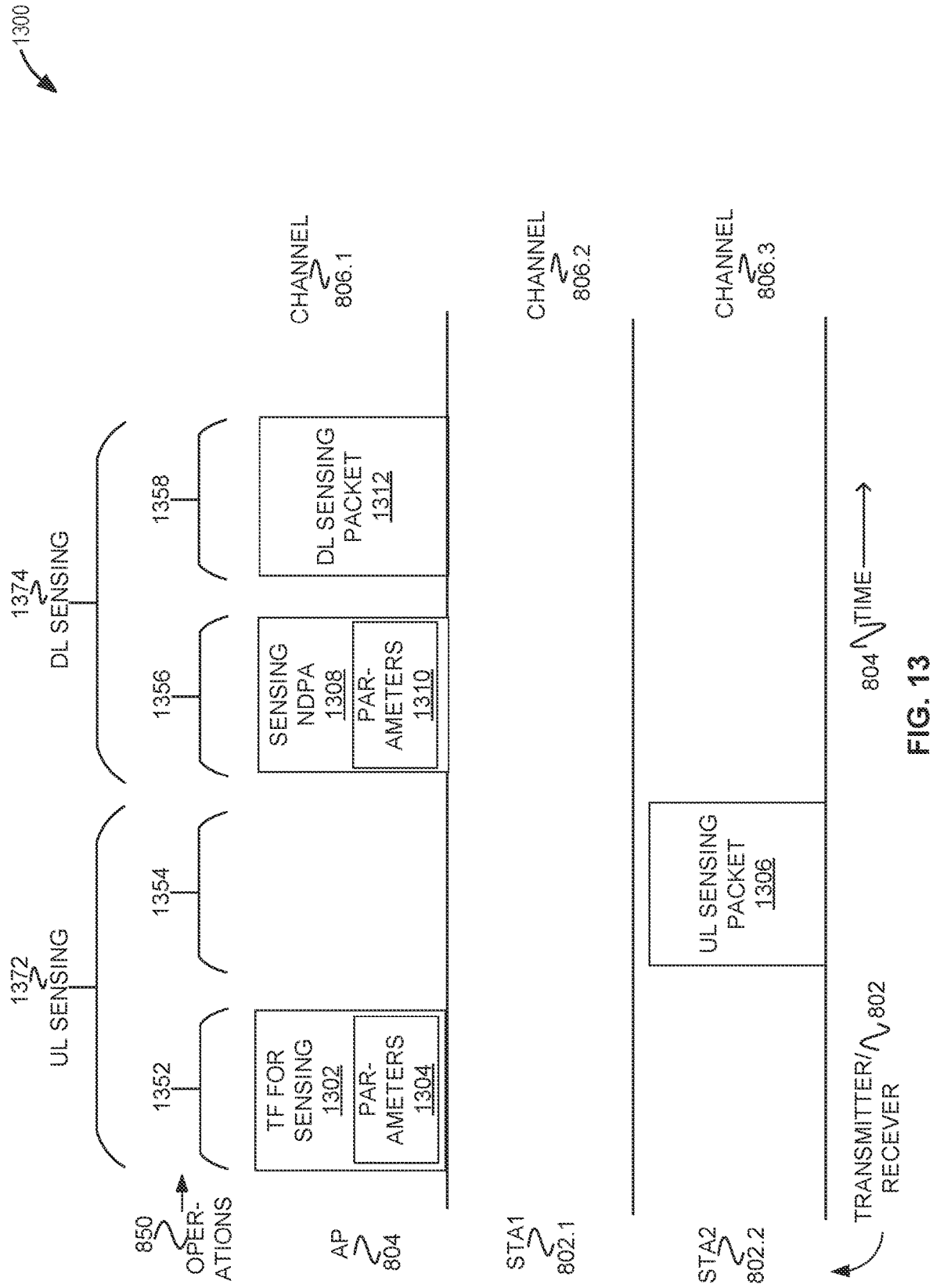
FIG. 13 illustrates a method of multi-device wireless sensing, in accordance with some embodiments.

FIG. 13 illustrates a method 1300 of multi-device wireless sensing, in accordance with some embodiments. Illustrated in FIG. 13 is STA1 504.1 as the sensing initiator and the sensing receiver. AP 502 as the sensing responder and the sending transmitter. STA2 504.2 as the sensing responder and the sensing transmitter.

The method 1300 includes operations 850 for UL sensing 1372 and DL sensing 1374. The method 1300 includes operation 1352 where a TF for sensing 1302 with parameters 1304 is transmitted. The method 1300 continues with STA2 802.2 transmitting UL sensing packet 1306 in response to the TF for sensing 1302. STA1 802.1 receives the UL sensing packet 1306. The method 1300 continues at operation 1356 with the AP 804 transmitting a sensing NDPA 1308 with parameters 1310. The method 1300 continues at operation 1358 with the AP 804 transmitting DL sensing packet 1312. STA1 802.1 receives the DL sensing packet 1312 and makes a determination whether an object moved based on the UL sensing packet 1306 and/or the DL sensing packet 1312. In some embodiments, the AP 804 transmits a frame that includes information for both the UL sensing packet 1306 and the DL sensing packet 1312 to be transmitted, e.g., RU information, spatial streams, duration, directional information, and so forth. In some embodiment, the UL sensing packet 1306 and the DL sensing packet 1312 are transmitted simultaneously. In some embodiments, the AP 502 first transmits the sensing NDPA 1308 and then then TF for sensing 1302, and then STA2 802.2 and the AP 804 simultaneously transmit UL sensing packet 1306 and DL sensing packet 1312, respectively.

Figure 14:
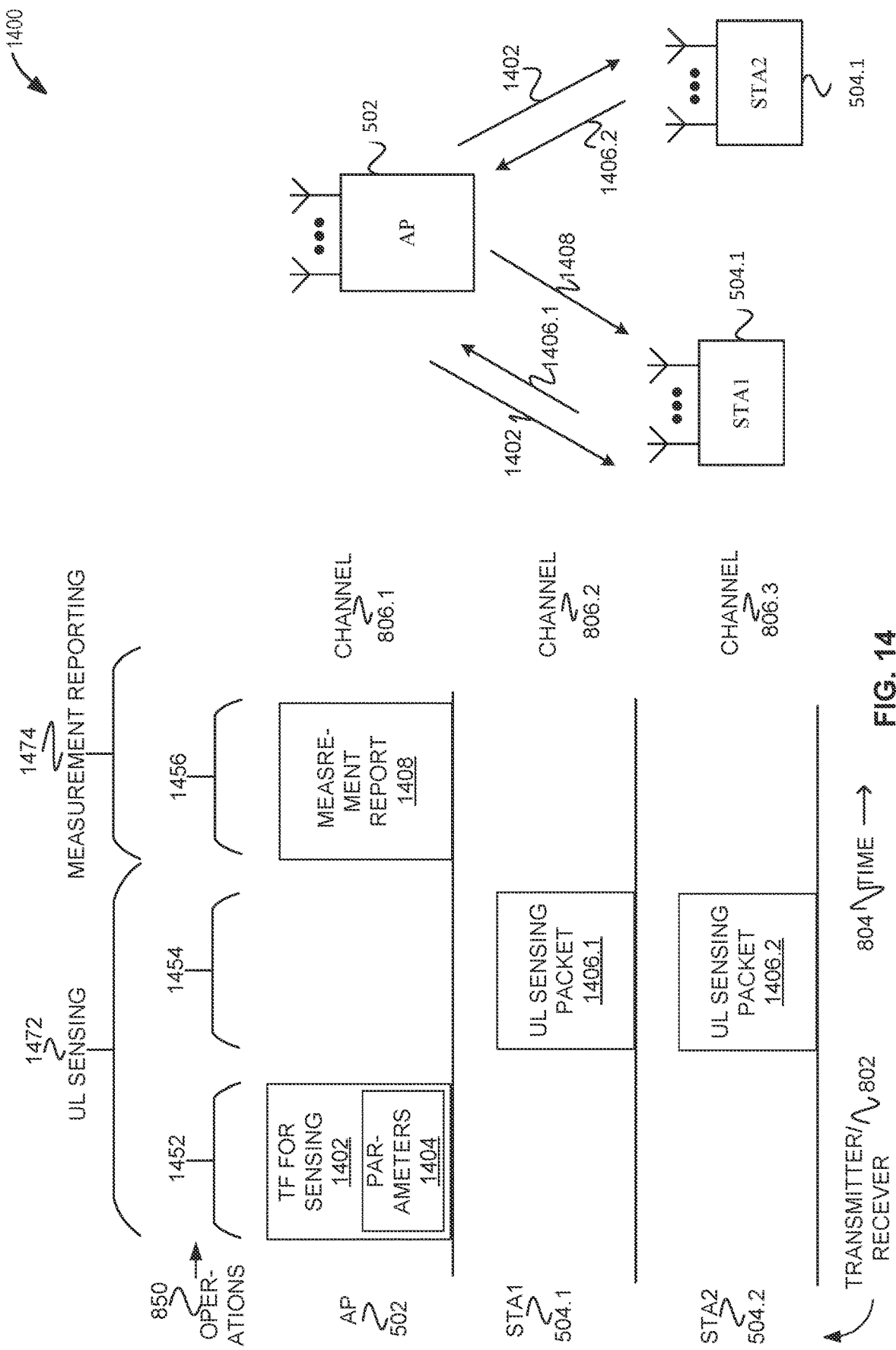
FIG. 14 illustrates a method of multi-device wireless sensing, in accordance with some embodiments.

FIG. 14 illustrates a method 1400 of multi-device wireless sensing, in accordance with some embodiments. Illustrated in FIG. 14 is STA1 504.1 as the sensing initiator and the sensing transmitter. AP 502 as the sensing responder and the sending transmitter. STA2 504.2 as the sensing responder and the sensing transmitter.

The method 1400 includes operations 850 with an UL sensing 1472 portion and a measurement reporting 1474 portion. The method 1400 includes operation 1452 with the AP 502 transmitting TF for sensing 1402 with parameters 1404. The TF for sensing 1402 includes information for STA1 504.1 and STA2 504.2 to transmit UL sensing packet 1406.1 and UL sensing packet 1406.2, respectively. The method 1400 includes operation 1454 with STA1 504.1 and STA2 504.2 transmitting UL sensing packet 1406.1 and UL sensing packet 1406.2, respectively, in accordance with information in the FT for sensing 1402. The AP 502 receives the UL sensing packets 1406 and generates measurement report 1408. The method 1400 includes operation 1456 with the AP 502 transmitting measurement report 1408. The TF for sensing 1402 may include information to indicate how the measurement report 1408 will be transmitted and/or what the measurement report 1408 will include. In some embodiments, another packet is transmitted before the measurement report 1408 to indicate how the measurement report 1408 will be transmitted and/or what the measurement report 1408 will include. STA1 504.1 receives the measurement report 1408 and determines if there is movement based on the management report 1408.

Figure 15:
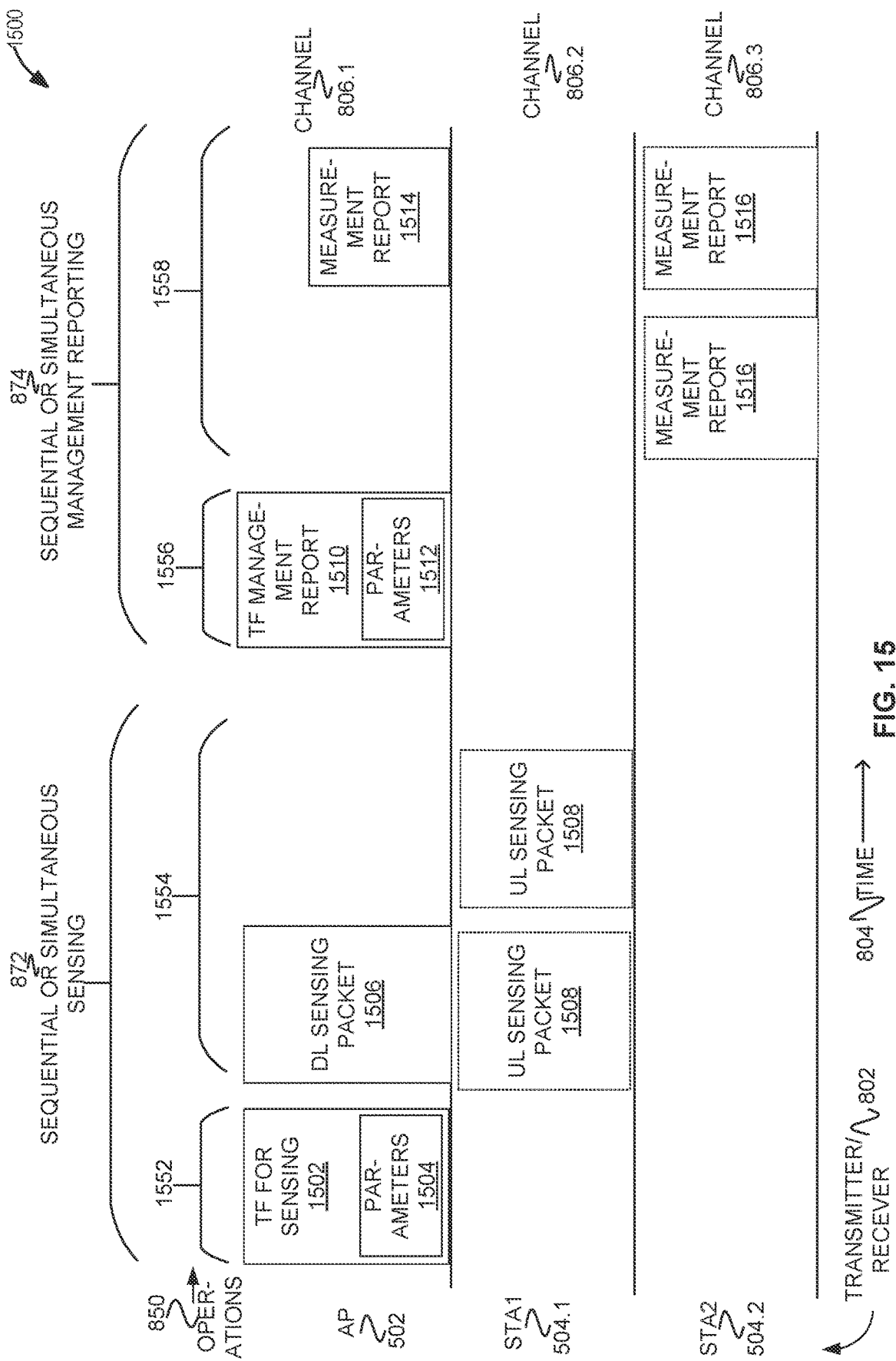
FIG. 15 illustrates a method of multi-device wireless sensing, in accordance with some embodiments.

FIG. 15 illustrates a method 1500 of multi-device wireless sensing, in accordance with some embodiments. Illustrated in FIG. 15 is STA1 504.1 as the sensing initiator and the sensing transmitter. AP 502 as the sensing responder and the sending transmitter. STA2 504.2 as the sensing responder and the sensing transmitter.

The method 1500 includes operations 850 for a sequential or simultaneous sensing 872 portion and operations 850 for a sequential or simultaneous management reporting phase 874. The method 1500 includes operation 1552 with the AP 502 transmitting TF for sensing 1502 with parameters 1504. The TF for sensing 1502 may be a TF for sensing as disclosed herein. The method 1500 includes operation 1554 where the AP 502 and STA1 504.1 transmit DL sensing packet 1506 and UL sensing packet 1508, respectively, either simultaneously or sequential with either the AP 502 or STA1 504.1 transmitting first.

The method 1500 includes operation 1556 with the AP 502 transmitting TF management report 1510 frame with parameters 1512. The TF management report 1510 may be a TF management report as disclosed herein. The method 1500 includes operation 1558 with the AP 502 and STA2 504.2 transmitting measurement report 1514 and measurement report 1516, respectively either simultaneously or sequential with either the AP 502 or STA2 504.2 transmitting first. In some embodiments, the AP 502 receives the measurement report 1516 from STA2 504.2 and then incorporates the measurement report 1516 into measurement report 1514 and then transmits measurement report 1514. Measurement report 1516 includes information regarding the reception of DL sensing packet 1506 and/or UL sensing packet 1508. Measurement report 1514 includes information regarding the reception of UL sensing packet 1508. STA1 504.1 receives the measurement report 1516 and/or measurement report 1514 and determines motion of an object or object based on the information in the measurement report 1516 and/or measurement report 1514 and information regarding the transmission of the DL sensing packet 1506 and UL sending packet 1508 that may be included in the TF for sensing 1502 and/or the measurement report 1514 and/or measurement report 1516.

Figure 16:
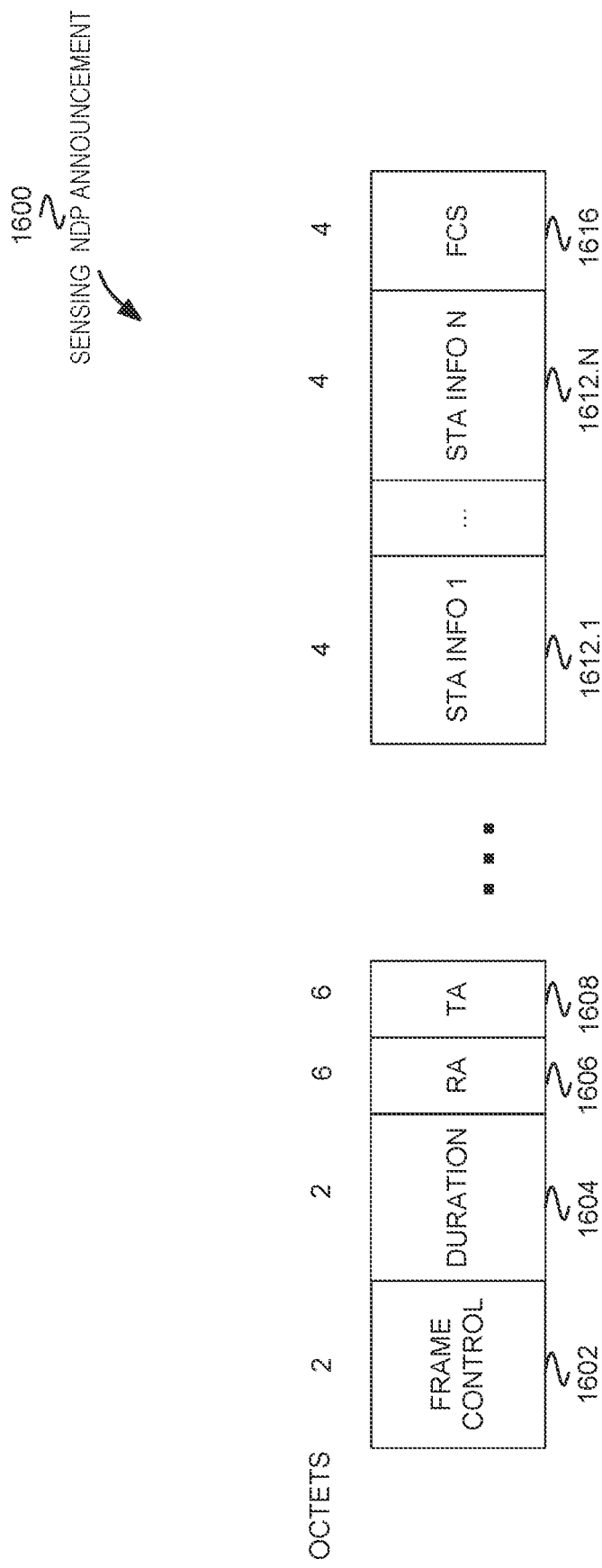
FIG. 16 illustrates a sensing null data packet (NDP) announcement, in accordance with some embodiments.

FIG. 16 illustrates a sensing null data packet (NDP) announcement frame 1600, in accordance with some embodiments. Illustrated FIG. 16 is frame control subfield 1602, duration subfield 1604, receiver address (RA) subfield 1606, transmitter address (TA) subfield 1608, STA info 1 subfield 1612.1 through STA info N subfield 1612.N, and frame check sequence (FCS) subfield 1616.

The frame control subfield 1602 indicates a type of NDP announcement in accordance with some embodiments. The duration subfield 1604, RA subfield 1606, TA subfield 1608 may be set in accordance with IEEE 802.11.

The STA info 1 subfield 1612.1 through STA info N subfield 1612.N may include an AID11/RSID11 indicating an STA. The STA info 1 subfield 1612.1 through STA info N subfield 1612.N may indicate parameters for sensing NDPs that will be transmitted after the sensing NDP announcement frame 1600. For example, there may be indication of an RU or RUs which will be transmitted, a power of the transmissions of the NDP, a repetition of the NDPs, a duration of the LTF of the NDP, and so forth (information may be included from the sensing parameter element or other parameters as disclosed in IEEE 802.11 and herein). The RU may include an allocation for MU-MIMO (or MIMO) and OFDMA (or OFDM). One or more of the subfields of NDPA frame 1600 may be optional. NDPA frame 1600 may include one or more additional subfields. Sensing NDPA 1102, 1308 may be a sensing NDP announcement frame 1600, in accordance with some embodiments.

Figure 17:
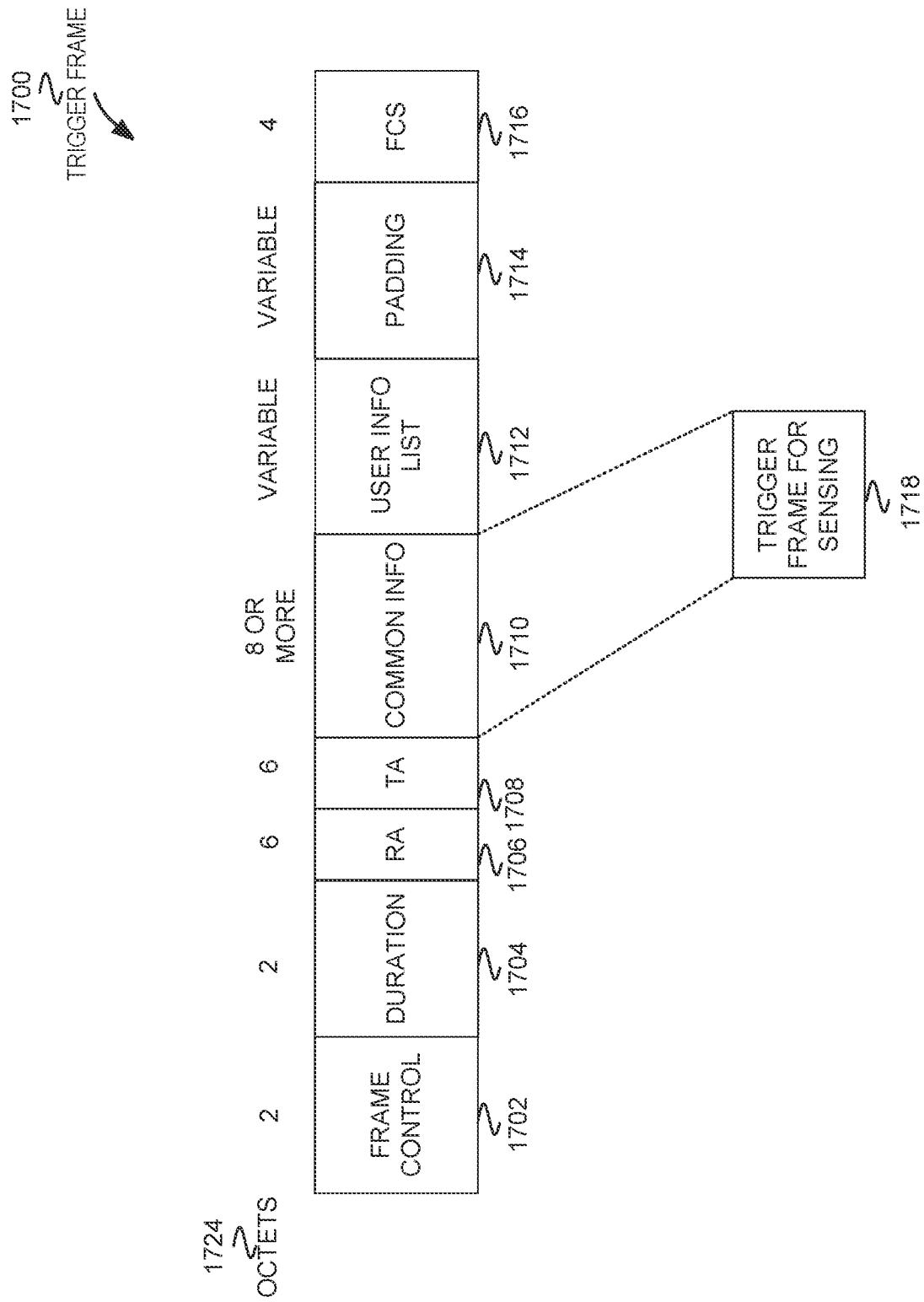
FIG. 17 illustrates a trigger frame (TF), in accordance with some embodiments.

FIG. 17 illustrates a trigger frame (TF) 1700, in accordance with some embodiments. Trigger frame 1700 may include frame control subfield 1702, duration subfield 1704, RA subfield 1706, TA subfield 1708, common information (info) 1710, user info list 1712, padding 1714 subfield, and FCS 1716. Octets 1724 indicates a number of octets of the subfields, in accordance with some embodiments.

The common info 1710 may include a trigger type 1720 that may indicate a trigger subtype such as trigger frame for sensing 1718 or trigger frame for management report. The user info list 1712 may include subfields for each STA. The common info 1710 and/or user info list 1712 may include information for a STA and/or AP to transmit a packet such as a sensing NDP. The information may include an RU, spatial stream, duration, a repetition number, directional information, and so forth (information may be included from the sensing parameter element or other parameters as disclosed in IEEE 802.11 and herein). The RU may include an allocation for MU-MIMO (or MIMO) and OFDMA (or OFDM). One or more of the subfields of TF 1700 may be optional. TF 1700 may include one or more additional subfields. TF for sensing 812, 1202, 1302, 1402, 1502, TF management report 1004, 1510, may be a trigger frame 1700, in accordance with some embodiments.

Figure 18:
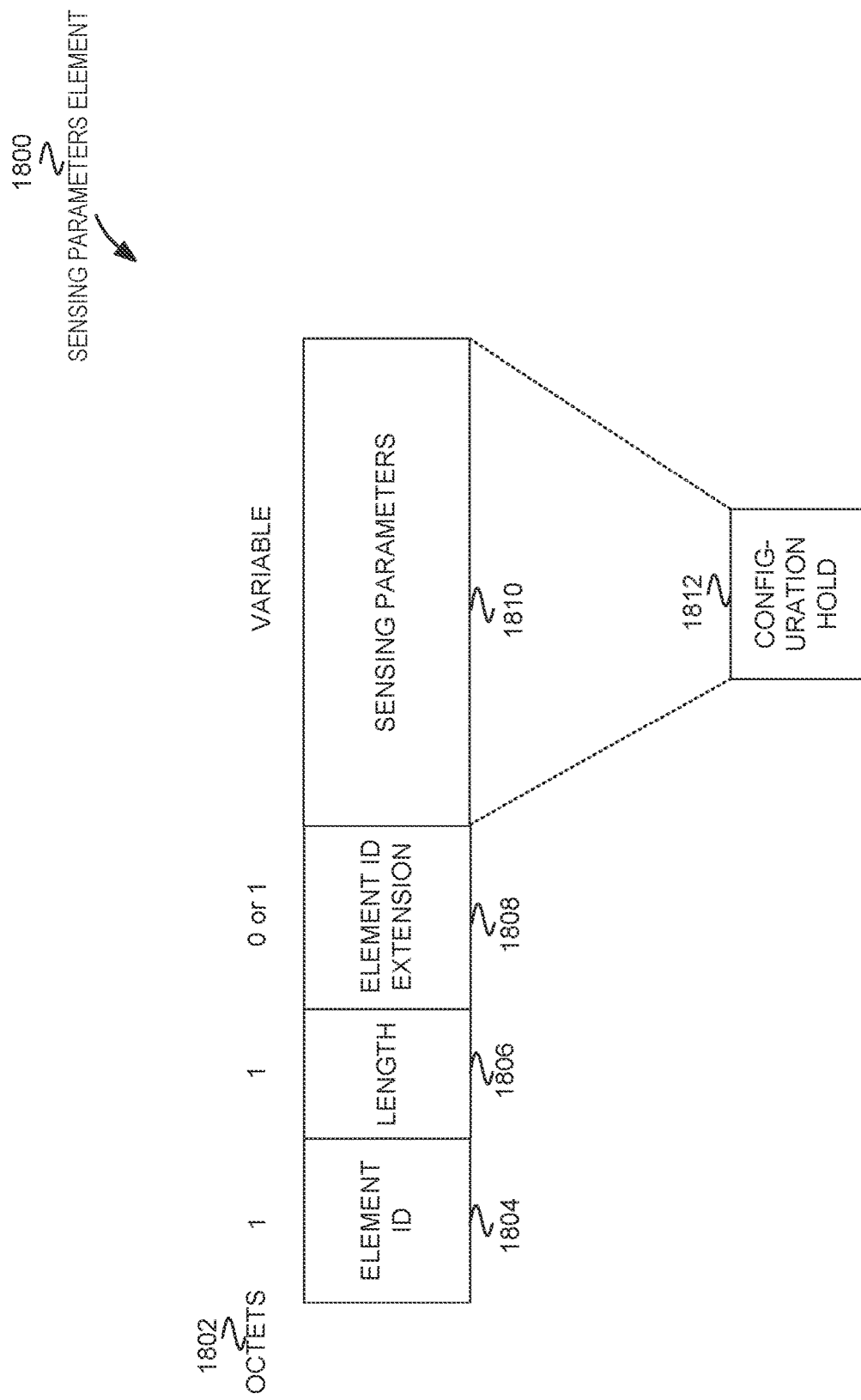
FIG. 18 illustrates a sensing parameters element, in accordance with some embodiments.

FIG. 18 illustrates a sensing parameters element 1800, in accordance with some embodiments. Illustrated in FIG. 18 is octets 1802, element ID 1804 field, length 1806 field, element ID extension 1808 field, and sensing parameters field 1810. The sensing parameters elements 1800 is encoded in a data portion of a PPDU and is identified by the Element ID 1804 field and, if present, the Element ID Extension 1808 field. The Length 1806 field indicates the number of octets in the sensing parameters element 1800 excluding the Element ID 1804 field and the Length 1806 fields. The sensing parameters field 1810 include information for conducting sensing as disclosed herein. The sensing initiator and/or the sensing responder transmit the sensing parameters element 1800, e.g., the sensing parameters element 1800 is included in an initial fine timing measurement request frame or initial sensing request frame during an initial negotiation phase. The sensing parameters field 1810 include a configuration hold 1812 field that indicates whether the transmit configuration should remain the same for transmitting sensing PPDUs. In some embodiments, the configuration hold 1812 field indicates that the transmit configuration for the sensing packets, e.g., NDP PPDUs, should remain unchanged throughout a sensing session, which may improve the accuracy of the sensing measurements. In some embodiments, the configuration hold 1812 field indicates whether the STA should maintain a transmit configuration unchanged during UL sensing. In some embodiments, the configuration hold 1812 field indicates that the transmit configuration for the sensing PPDUs should remain unchanged for a portion of the sensing PPDUs. For example, the configuration hold 1812 field indicates that the STA or AP is to determine a transmit configuration, e.g., based on the strength of received signals and based on a target receive signal strength, when the STA or AP receives a first packet initiating a sensing session or protocol. The STA or AP then redetermines the transmit configuration when it receives the next packet initiating a new sensing session or protocol. In some embodiments, the configuration hold 1812 field is included in a sensing NDPA, e.g., 1308, or a TF for sensing, e.g., 1302, and/or TF for management reporting, e.g., 1510. The configuration hold 1812 field has a different name, in accordance with some embodiments. In some embodiments, the sensing parameters 1810 (or a portion of the parameters) and/or the configuration hold 1812 field are included in another frame, e.g., the sending NDP announcement frame 1600 or trigger frame 1700. The sensing parameters element 1800 may be included with the trigger frame 1700 and/or sending NDP announcement frame 1600, in accordance with some embodiments.

In some embodiments, unidirectional sounding is used where there is only DL sounding or UL sounding, instead of bidirectional sounding only. In some embodiments, a field in the Sensing Parameters element exchanged during the negotiation phase, where the initiator and responder negotiates whether the subsequent sounding is DL only, or UL only, or DL plus UL. In some embodiments, simultaneous DL and UL sounding is used where both the AP and STA transmits the NDP packets at the same time to another STA. In some embodiments, sequential UL and DL sounding is used where the AP and the STA send NDP packets sequentially. In some embodiments, OFDMA multiplexing and/or MIMO is for transmitting DL NDP packets to multiple STAs, or in the UL direction where multiple STAs send NDP packets to an AP. In some embodiment directional transmissions are used. In some embodiments, during the sounding measurement phase, the sensing transmitters who transmit NDP packets hold/freeze their transmit configurations. In some embodiments, measurement feedback is optional. In some embodiments, a Sensing Measurement element can be included in a location measurement report (LMR) frame to report specifically the results used for Wi-Fi sensing. For example, the sensing measurement element may include the measurement results of measurement report 1006.1, 1006.2, 1106.1, 1106.2, 1408, 1514, 1516, and the AP 502 or STAs 504 may transmit a LMR frame that includes the sensing measurement element (not illustrated).

In some embodiments, the sensing parameters element 1800 is used in negotiations between the initiator and one or more responders. The initiator (or responder) may initially send a sensing parameters element 1800 and the one or more responders (or initiators) may send a sensing parameters element 1800 back which has the fields set in accordance with the negotiation where the fields are set based on rules included in the communication standard and the values of the sensing parameter element 1800 received. In some embodiments, the initiator (or responder) will then resend the sensing parameters element 1800 with final values that initiator (or responder) is to use.

In some embodiments, methods 800-1700 modify a portion of an IEEE 802.11az method for determining locations. In some embodiments, in methods 800-1700, the duration between the transmission of sequential frames is a SIF S.

Figure 19:
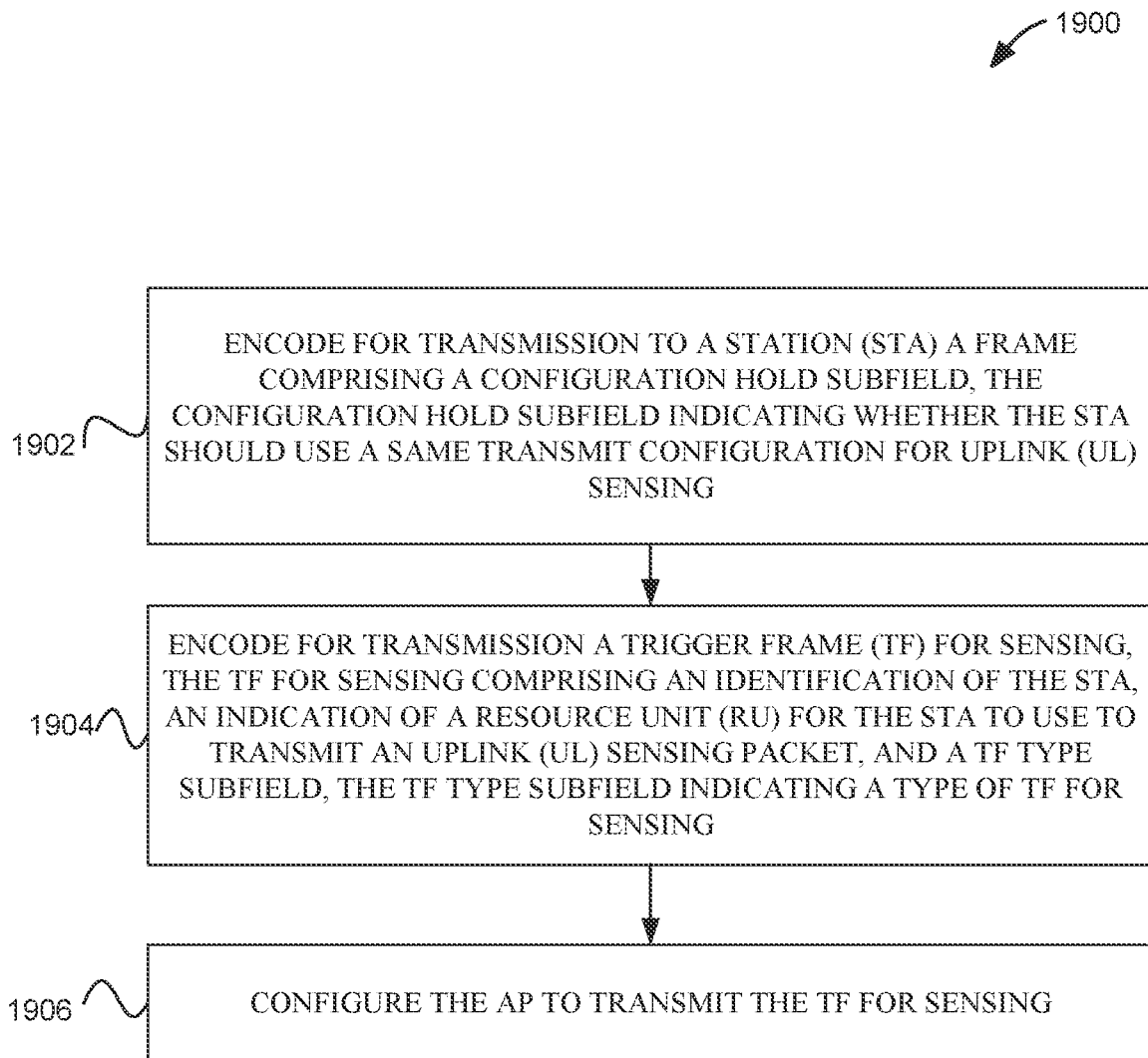
FIG. 19 illustrates a method of multi-device wireless sensing, in accordance with some embodiments.

FIG. 19 illustrates a method 1900 of multi-device wireless sensing, in accordance with some embodiments. The method 1900 begins at operation 1902 with encoding for transmission to a STA a frame including a configuration hold subfield, the configuration hold subfield indicating whether the STA should use a same transmit configuration for UL sensing. For example, an AP 502 transmits the sensing parameters element 1800 to STAs 504 before UL sensing and the sensing parameters element 1800 includes a configuration hold 1812 subfield. The configuration hold 1812 subfield can be set by the AP 502 to indicate that the STA 504 should maintain a transmit configuration during UL sensing. In some examples, there are UL sensing periods and the STA 504 can reconfigure the transmit configuration after a UL sensing period is over.

The method 1900 continues at operation 1904 with encoding for transmission a TF for sensing, the TF for sensing comprising an identification of the STA, an indication of a RU for the STA to use to transmit an UL sensing packet, and a TF type subfield, the TF type subfield indicating a type of TF for sensing. For example, the TF for sensing may be a trigger frame 1700 with a TF type subfield such as trigger frame for sensing 1718. The TF for sensing may be TF for sensing 812, TF for sensing 1202, TF for sensing 1302, TF for sensing 1402, or TF for sensing 1502.

The method 1900 continues at operation 1906 with configuring the AP to transmit the TF for sensing. For example, an apparatus of the AP 502 can configure the AP 502 to transmit a frame or a TF for sensing.

The method 1900 may include one or more additional operations. One or more operations of the method 1900 may be optional. The operations of method 1900 may be performed in a different order. The method 1900 may be performed by an apparatus of an AP 502, an AP 502, an apparatus of a STA 504, or a STA 504.

FIG. 20 illustrates a method 2000 of multi-device wireless sensing, in accordance with some embodiments. The method 2000 begins at operation 2002 with decoding a TF for sensing, the TF for sensing including an identification of the STA, an indication of a RU for the STA to use to transmit an UL sensing packet, and TF type subfield, the TF type subfield indicating a type of TF for sensing. For example, the TF for sensing may be a trigger frame 1700 with a TF type subfield such as trigger frame for sensing 1718. The TF for sensing may be TF for sensing 812, TF for sensing 1202, TF for sensing 1302, TF for sensing 1402, or TF for sensing 1502.

The method continues at operation 2004 with encoding for transmission the UL sensing packet in accordance with the RU. For example, the UL sensing packet is UL sending packet 814, UL sensing packet 1208, UL sensing packet 1306, UL sensing packet 1406, or UL sensing packet 1508.

The method 2000 may include one or more additional operations. One or more operations of the method 2000 may be optional. The operations of method 2000 may be performed in a different order. The method 2000 may be performed by an apparatus of an AP 502, an AP 502, an apparatus of a STA 504, or a STA 504.

To perform a TB sensing measurement exchange in which the AP is operating as a sensing initiator, the AP is configured to encode a sensing polling trigger frame for transmission. The sensing polling trigger frame is to assign at least some of the STAs of the plurality to be polled. The sensing polling trigger frame is encoded to allocate a resource unit (RU) to each of the STAs assigned to be polled. The AP is also configured to decode response frames received from one or more of the STAs in response to the sensing polling trigger frame. The response frames indicate that one of the STAs intends to participate in the TB sensing measurement exchange. Each response frame is received on the allocated RU.

To perform a TB sensing measurement exchange in which the AP is operating as a sensing initiator, a STA is configured to decode a sensing polling trigger frame received from the AP. The sensing polling trigger frame is to assign at least some of the STAs of the plurality to be polled. The sensing polling trigger frame is encoded to allocate a resource unit (RU) to each of the STAs assigned to be polled. The STA is also configured to encode a response frame for transmission to the AP in response to the sensing polling trigger frame. The response frame indicates that the STA intends to participate in the TB sensing measurement exchange. The response frame is transmitted on the allocated RU.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of an access point (AP) configured for operation in a wireless local area network (WLAN), the apparatus comprising: processing circuitry; and memory,
wherein to perform WLAN sensing, the processing circuitry is configured to:
establish a sensing measurement session by transmission of a sensing measurement request frame to each non-AP station (STA) of a plurality of non-AP stations (STAs) that are operating as sensing responders,
wherein each sensing measurement request frame includes a sensing measurement parameters element encoded to include an element ID field, a length field, and a sensing measurement parameters field, the sensing measurement parameters field indicating parameters for use by the sensing responders for transmissions and receptions of null-data packets (NDPs) during trigger-based (TB) sensing measurement exchanges,
wherein to perform a TB sensing measurement exchange in which the AP is operating as a sensing initiator, the processing circuitry is configured to:
encode a sensing polling trigger frame for transmission, the sensing polling trigger frame to assign at least some of the STAs of the plurality to be polled, the sensing polling trigger frame encoded to allocate a resource unit (RU) to each of the STAs assigned to be polled; and decode response frames received from one or more of the STAs in response to the sensing polling trigger frame, the response frames indicating that one of the STAs intends to participate in the TB sensing measurement exchange, each response frame received on the allocated RU.

2. The apparatus of claim 1, wherein the processing circuitry is configured to perform the WLAN sensing to estimate features, including motion, of objects in an area of interest.

3. The apparatus of claim 2 wherein the processing circuitry is configured to encode the sensing polling trigger frame to include a trigger frame type subfield to indicate sensing polling.

4. The apparatus of claim 3, wherein at least one of the STAs is a sensing transmitter and at least one other of the STAs is a sensing receiver, and wherein as part of the TB sensing measurement exchange, the processing circuitry is configured to:
encode a sounding trigger frame for transmission to the at least one STA that is a sensing transmitter, the sounding trigger frame to solicit an NDP.

5. The apparatus of claim 4, wherein the NDPs solicited by the sounding trigger frame are received on the allocated RU, the NDP being spatially multiplexed.

6. The apparatus of claim 5, wherein the processing circuitry is configured to encode the sounding trigger frame to include the trigger frame type subfield to indicate sounding.

7. The apparatus of claim 6, wherein as part of the TB sensing measurement exchange, the processing circuitry is further configured to:
encode a NDP announcement (NDPA) frame for transmission to the at least one STA that is a sensing responder; and
encode a NDP for transmission to the at least one STA that is a sensing responder a short interframe space (SIFS) after transmission of the NDPA frame.

8. The apparatus of claim 7, wherein the sensing measurement session comprises a plurality of sensing measurement exchanges including the TB sensing measurement exchange.

9. The apparatus of claim 8, wherein the sensing measurement parameters define a transmit configuration, and
wherein the sensing measurement parameters field is encoded to indicate whether the transmit configuration is to remain unchanged for each sensing measurement exchange of the plurality of sensing measurement exchanges of the sensing measurement session.

10. The apparatus of claim 5, wherein the processing circuitry is configured to estimate motion of an object in the area of interest based at least in part on the NDPs solicited by the sounding trigger frame.

11. A non-transitory computer-readable storage medium that stores instructions for execution by processing circuitry of an access point (AP) configured for operation in a wireless local area network (WLAN), wherein to perform WLAN sensing, the processing circuitry is configured to:
establish a sensing measurement session by transmission of a sensing measurement request frame to each non-AP station (STA) of a plurality of non-AP stations (STAs) that are operating as sensing responders, wherein each sensing measurement request frame includes a sensing measurement parameters element encoded to include an element ID field, a length field, and a sensing measurement parameters field, the sensing measurement parameters field indicating parameters for use by the sensing responders for transmissions and receptions of null-data packets (NDPs) during trigger-based (TB) sensing measurement exchanges, wherein to perform a TB sensing measurement exchange in which the AP is operating as a sensing initiator, the processing circuitry is configured to:
encode a sensing polling trigger frame for transmission, the sensing polling trigger frame to assign at least some of the STAs of the plurality to be polled, the sensing polling trigger frame encoded to allocate a resource unit (RU) to each of the STAs assigned to be polled; and
decode response frames received from one or more of the STAs in response to the sensing polling trigger frame, the response frames indicating that one of the STAs intends to participate in the TB sensing measurement exchange, each response frame received on the allocated RU.

12. The non-transitory computer-readable storage medium of claim 11, wherein the processing circuitry is configured to perform WLAN sensing to estimate features, including motion, of objects in an area of interest.

13. The non-transitory computer-readable storage medium of claim 12 wherein the processing circuitry is configured to encode the sensing polling trigger frame to include a trigger frame type subfield to indicate sensing polling.

14. The non-transitory computer-readable storage medium of claim 13, wherein at least one of the STAs is a sensing transmitter and at least one other of the STAs is a sensing receiver, and
wherein as part of the TB sensing measurement exchange, the processing circuitry is configured to:
encode a sounding trigger frame for transmission to the at least one STA that is a sensing transmitter, the sounding trigger frame to solicit an NDP.

15. The non-transitory computer-readable storage medium of claim 14, wherein the NDPs solicited by the sounding trigger frame are received on the allocated RU, the NDP being spatially multiplexed.

16. The non-transitory computer-readable storage medium of claim 15, wherein the processing circuitry is configured to encode the sounding trigger frame to include the trigger frame type subfield to indicate sounding.

17. The non-transitory computer-readable storage medium of claim 16, wherein as part of the TB sensing measurement exchange, the processing circuitry is further configured to:
encode a NDP announcement (NDPA) frame for transmission to the at least one STA that is a sensing responder; and
encode a NDP for transmission to the at least one STA that is a sensing responder a short interframe space (SIFS) after transmission of the NDPA frame.

18. The non-transitory computer-readable storage medium of claim 17, wherein the sensing measurement session comprises a plurality of sensing measurement exchanges including the TB sensing measurement exchange.

19. An apparatus of non-Access Point Station (STA) configured for operation in a wireless local area network (WLAN), the apparatus comprising: processing circuitry; and memory, wherein to perform WLAN sensing, the processing circuitry is configured to:

establish a sensing measurement session with an access point (AP) based on reception of a sensing measurement request frame, the sensing measurement request frame being sent to each non-AP station (STA) of a plurality of non-AP stations (STAs) that are operating as sensing responders, wherein each sensing measurement request frame includes a sensing measurement parameters element encoded to include an element ID field, a length field, and a sensing measurement parameters field, the sensing measurement parameters field indicating parameters for use by the sensing responders for transmissions and receptions of null-data packets (NDPs) during trigger-based (TB) sensing measurement exchanges, wherein to perform a TB sensing measurement exchange in which the AP is operating as a sensing initiator, the processing circuitry is configured to:

decode a sensing polling trigger frame received from the AP, the sensing polling trigger frame to assign at least some of the STAs of the plurality to be polled, the sensing polling trigger frame encoded to allocate a resource unit (RU) to each of the STAs assigned to be polled; and encode a response frame for transmission to the AP in response to the sensing polling trigger frame, the response frame indicating that the STA intends to participate in the TB sensing measurement exchange, the response frame transmitted on the allocated RU.

20. The apparatus of claim 19, wherein the processing circuitry is configured to perform the WLAN sensing with the AP to estimate features, including motion, of objects in an area of interest.

* * * * *